United States Patent
Kim et al.

(10) Patent No.: US 10,992,894 B2
(45) Date of Patent: Apr. 27, 2021

(54) IMAGE SENSOR, ADDRESS DECODER INCLUDING CLOCK TREE, AND IMAGE PROCESSING SYSTEM INCLUDING THE IMAGE SENSOR

(71) Applicant: SAMSUNG ELECTRONICS CO., LTD., Suwon-si (KR)

(72) Inventors: Kyungtae Kim, Suwon-si (KR); Yunhwan Jung, Hwaseong-si (KR); Heesung Chae, Seoul (KR); Sukki Yoon, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/838,483

(22) Filed: Apr. 2, 2020

(65) Prior Publication Data
US 2021/0067723 A1 Mar. 4, 2021

(30) Foreign Application Priority Data
Sep. 2, 2019 (KR) .................. 10-2019-0108472

(51) Int. Cl.
*H04N 5/376* (2011.01)
*H04N 5/374* (2011.01)
(Continued)

(52) U.S. Cl.
CPC .......... *H04N 5/3765* (2013.01); *H04N 5/347* (2013.01); *H04N 5/374* (2013.01); *H04N 5/378* (2013.01)

(58) Field of Classification Search
CPC ...... H04N 5/347; H04N 5/376; H04N 5/3765; H04N 5/378; H04N 5/335–379; G06F 12/0207; G06F 12/06; G11C 7/11039; G11C 7/22–225; H03K 19/0016; H03K 3/012; H03K 5/15–1515
See application file for complete search history.

(56) References Cited

U.S. PATENT DOCUMENTS 8,671,380 B2   3/2014   Wang et al.
8,988,108 B2   3/2015   Quinnell et al.
(Continued)

FOREIGN PATENT DOCUMENTS

JP   3534096 B2   6/2004
JP   5879925 B2   3/2016
(Continued)

*Primary Examiner* — Paul M Berardesca
(74) *Attorney, Agent, or Firm* — Lee IP Law, PC

(57) ABSTRACT

An image sensor includes a pixel array including pixels that are arranged in a matrix and respectively generate pixel signals, a row driver to drive the plurality of pixels row by row, a timing generator to generate a clock signal and address signals, a column driver to generate a plurality of column selection signals sequentially activated in response to the clock signal and the address signals, and a column array to receive the pixel signals through a plurality of column lines, perform an analog-to-digital conversion on the pixel signals, and sequentially output pixel data values through an output buffer. The column driver may include a clock tree including first delay elements and second delay elements to generate a plurality of delay clock signals, and a decoding circuit to generate the plurality of column selection signals.

13 Claims, 18 Drawing Sheets

(51) Int. Cl.
*H04N 5/347* (2011.01)
*H04N 5/378* (2011.01)

(56) References Cited

U.S. PATENT DOCUMENTS

| | | |
|---|---|---|
| 9,141,739 B2 | 9/2015 | Ishikawa et al. |
| 9,411,391 B2 | 8/2016 | Bhatia et al. |
| 2003/0179638 A1* | 9/2003 | Clark ........................ G11C 8/10 365/230.06 |
| 2018/0197910 A1* | 7/2018 | Lee ................... H01L 27/14609 |
| 2020/0075070 A1* | 3/2020 | Gupta ....................... G11C 8/08 |

FOREIGN PATENT DOCUMENTS

| | | |
|---|---|---|
| JP | 5883676 B2 | 3/2016 |
| KR | 10-0960715 B1 | 5/2010 |

* cited by examiner

IMAGE SENSOR, ADDRESS DECODER INCLUDING CLOCK TREE, AND IMAGE PROCESSING SYSTEM INCLUDING THE IMAGE SENSOR

CROSS-REFERENCE TO RELATED APPLICATION

Korean Patent Application No. 10-2019-0108472, filed on Sep. 2, 2019, in the Korean Intellectual Property Office, and entitled: "Image Sensor, and Address Decoder Including Clock Tree, and Image Processing System Including the Image Sensor," is incorporated by reference herein in its entirety.

BACKGROUND

1. Field

Embodiments relate to an image sensor, an address decoder including a clock tree, and an image processing system including the image sensor.

2. Description of the Related Art

An image sensor is a device that captures an image, e.g., a two-dimensional or three-dimensional image of an object. The image sensor may sense light using a photoelectric conversion element that reacts according to intensity of light reflected from the object, and may generate image data based on the sensed light.

SUMMARY

Embodiments are directed to an image sensor, including a pixel array including a plurality of pixels that are arranged in a matrix and respectively generate pixel signals, a row driver configured to drive the plurality of pixels row by row, a timing generator configured to generate a clock signal and address signals, a column driver configured to generate a plurality of column selection signals sequentially activated in response to the clock signal and the address signals, and a column array configured to receive the pixel signals through a plurality of column lines, perform an analog-to-digital conversion on the pixel signals, and sequentially output pixel data values through an output buffer. The column driver may include a clock tree including a plurality of first delay elements that output first delay signals each being divided into at least two in response to the clock signal, and including a plurality of second delay elements that receive the first delay signals and output second delay signals each being divided into at least two, the clock tree being configured to generate a plurality of delay clock signals in response to the second delay signals, and a decoding circuit configured to generate the plurality of column selection signals in response to the address signals and the plurality of delay clock signals. At least one of the plurality of first delay elements and the plurality of second delay elements may be activated in response to at least one of a plurality of clock enable signals generated based on the address signals.

Embodiments are also directed to an address decoder, including a column array including a plurality of column circuits configured to receive cell signals output from each of a plurality of unit cells arranged in a matrix through column lines, perform an analog-to-digital conversion on the cell signals, and store digital values converted from the cell signals in a memory, the column array sequentially outputting the stored digital values through an output buffer, and a column driver configured to generate column selection signals for controlling the digital values to be sequentially output. The column driver may include a clock tree including a plurality of first delay elements that output first delay signals divided into at least two in response to a clock signal to be received, and including a plurality of second delay elements that receive the first delay signals and output second delay signals divided into at least two, the clock tree being configured to generate a plurality of delay clock signals in response to the second delay signals, and a decoding circuit configured to output the plurality of column selection signals for sequentially selecting the plurality of column circuits in response to the plurality of delay clock signals. At least one of the plurality of first delay elements and the plurality of second delay elements may be sequentially activated in response to at least one of a plurality of clock enable signals generated based on address signals for selecting the plurality of column circuits.

Embodiments are also directed to an image processing system, including an image sensor configured to sense an optical signal, and an image processor configured to control the image sensor and process image data output from the image sensor. The image sensor may include a pixel array including a plurality of pixels that are arranged in a matrix and generate pixel signals respectively, a column driver configured to generate a plurality of column selection signals sequentially activated in response to a clock signal and address signals, and a column array configured to receive a plurality of pixel signals from the plurality of pixels through a plurality of column lines, generate a plurality of pixel data values by performing an analog-to-digital conversion on the plurality of pixel signals, and sequentially output the plurality of pixel data values through an output buffer. The column driver may include a clock tree configured to generate a plurality of delay clock signals in response to the clock signal by using a plurality of delay elements, and a decoding circuit configured to generate the plurality of column selection signals in response to the address signals and the plurality of delay clock signals. The plurality of delay elements may be sequentially activated in response to at least one of a plurality of clock enable signals generated based on the address signals.

BRIEF DESCRIPTION OF THE DRAWINGS

Features will become apparent to those of skill in the art by describing in detail example embodiments with reference to the attached drawings in which.

DETAILED DESCRIPTION

Figure 1:
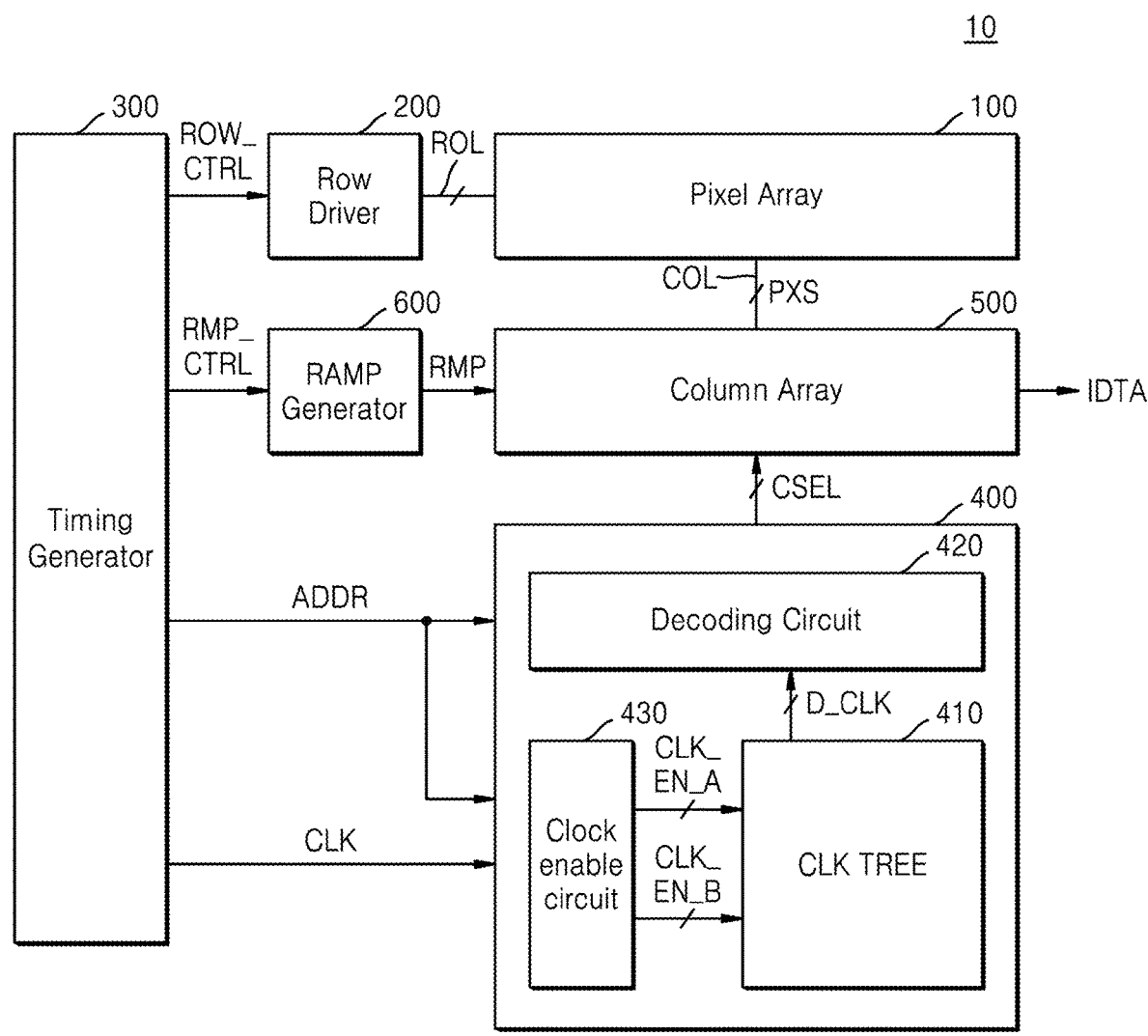
FIG. 1 illustrates a block diagram of an image sensor according to an example embodiment.

Hereinafter, embodiments will be described in detail with reference to the accompanying drawings. FIG. 1 is a block diagram illustrating an image sensor according to an example embodiment.

An image sensor 10 may be mounted in an electronic apparatus having an image or light sensing function. For example, the image sensor 10 may be mounted in an electronic apparatus such as a camera, a smartphone, a wearable apparatus, an Internet of Things (IoT) apparatus, a tablet personal computer (PC), a personal digital assistant (PDA), a portable multimedia player (PMP), a navigation system, a drone, or an advanced drivers assistance system (ADAS). The image sensor 10 may be mounted in an electronic apparatus provided as a component in a vehicle, furniture, a manufacturing facility, a door, various measurement apparatuses, or the like.

The image sensor 10 may include a pixel array 100, a row driver 200, a timing generator 300, a column driver 400, a column array 500, a ramp signal generator (ramp generator) 600. The image sensor 10 may further include additional configurations for reducing power consumption and improving a processing speed. The image sensor 10 may be a complementary metal-oxide-semiconductor (CMOS) image sensor.

The pixel array 100 may include a plurality of pixels 110 that are respectively connected to a plurality of row lines ROLs and a plurality of column lines COLs and arranged in a matrix. The plurality of pixels 110 may generate pixel signals PXS, respectively.

The row driver 200 may drive the pixel array 100 row by row in response to a row control signal ROW_CTRL provided from the timing generator 300.

The timing generator 300 may generate the row control signal ROW_CTRL for driving the row driver 200, an address signal ADDR, a clock signal CLK, and a ramp control signal RMP_CTRL for controlling the ramp signal generator 600.

The ramp signal generator 600 may output a ramp signal RMP in response to the ramp control signal RMP_CTRL provided from the timing generator 300. The ramp signal RMP may be compared with the pixel signals PXS.

The column driver 400 may generate column selection signals CSEL that are sequentially activated in response to the clock signal CLK and the address signal ADDR provided from the timing generator 300. The column driver 400 may include a clock tree 410 and a decoding circuit 420. The column driver 400 may further include a clock enable circuit 430.

The clock tree 410 may include a plurality of delay elements. The clock tree 410 may receive the clock signal CLK. The clock tree 410 may output a plurality of delay clock signals D_CLK that are divided into at least two signals and delayed to be output.

The decoding circuit 420 may generate a plurality of column selection signals CSEL in response to the delay clock signals D_CLK and the address signal ADDR.

The clock enable circuit 430 may generate a clock enable signal for selecting at least one of the delay elements in response to the clock signal CLK and the address signal ADDR.

The column array 500 may convert the pixel signals PXS received through the column lines COL into pixel data values PDV in response to the address signal ADDR provided from the timing generator 300 and the ramp signal RMP provided from the ramp signal generator 600, store the pixel data values PDV, and output the stored pixel data values PDV in response to the column selection signals CSEL provided from the column driver 400. The pixel data values PDV of one frame may be output as image data IDTA.

Figure 2A:
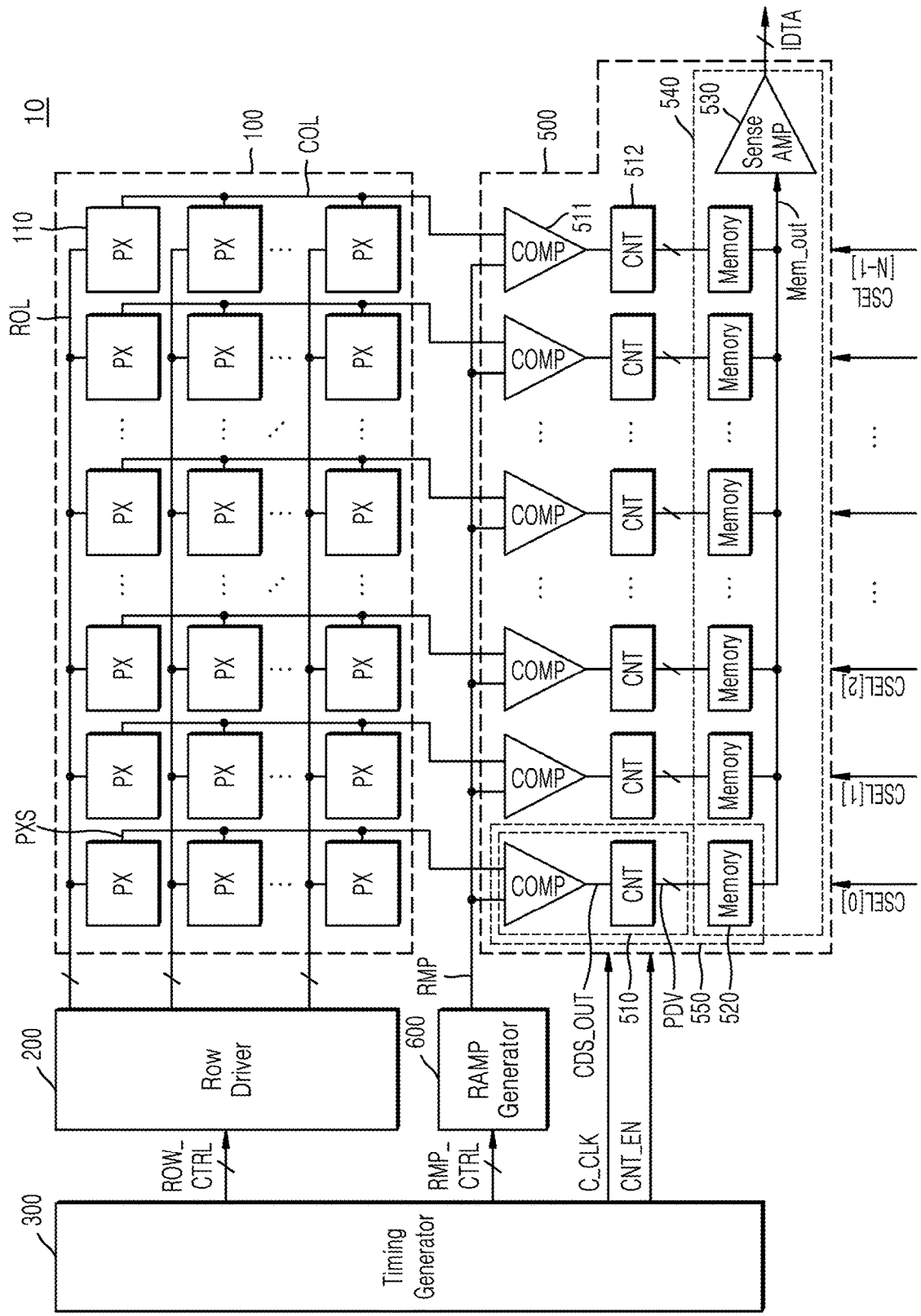
FIGS. 2A and 2B illustrate circuit diagrams of an embodiment of the image sensor of FIG. 1.
Figure 2B:
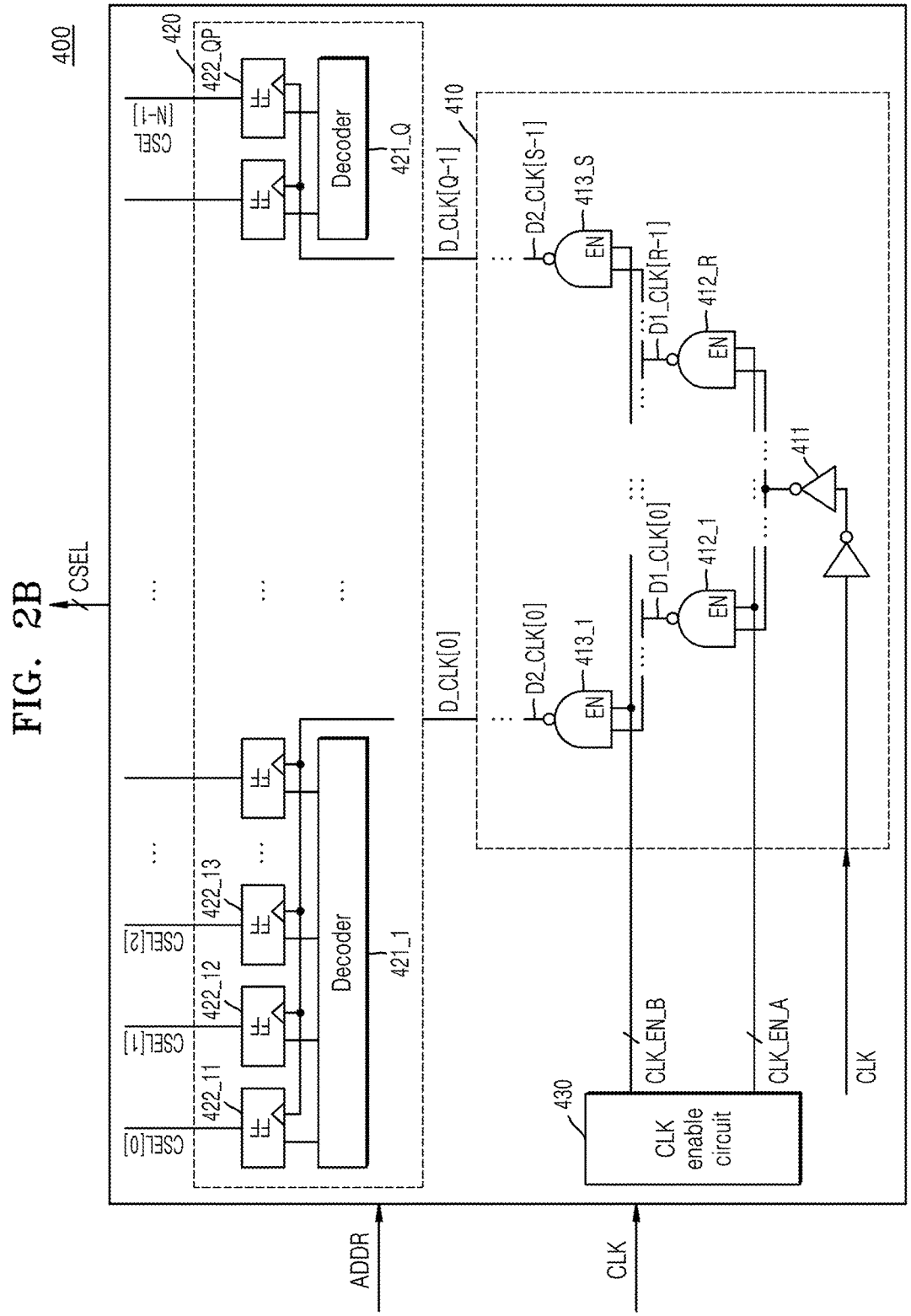

FIGS. 2A and 2B are circuit diagrams illustrating an embodiment of the image sensor 10 of FIG. 1.

Referring to FIG. 2A, the pixel array 100 includes a plurality of row lines ROL, a plurality of column lines COL, and a plurality of pixels 110 that are arranged in a matrix and respectively connected to the row lines ROL and the column lines COL. Each of the pixels 110 may function as a photoelectric conversion element that converts light into an electrical signal, and each of the pixels 110 may include a light sensing element (not illustrated) capable of accumulating photo-charges, such as a photodiode, a photogate, or a phototransistor. The pixel 110 may sense light using the light sensing element and convert the sensed light into the pixel signal PXS, which is an electrical signal. Hereinafter, it is assumed that each pixel 110 of the pixel array 100 includes a photodiode as the light sensing element, as an example.

The row driver 200 may drive the pixel array 100 row by row. The row driver 200 may decode the row control signal ROW_CTRL provided from the timing generator 300 and select at least one row of the rows configuring the pixel array 100 in response to the decoded row control signal ROW_CTRL. For example, the row control signal ROW_CTRL may be the address signal ADDR for a pixel that outputs the pixel signal PXS among the plurality of pixels 110.

The timing generator 300 may provide a control signal, the address signal ADDR, and/or the clock signal CLK respectively corresponding to elements of the image sensor 10, for example, the pixel array 100, the row driver 200, the column driver 400, the column array 500, and the ramp signal generator 600. The pixel array 100, the row driver 200, the column driver 400, the column array 500, and the ramp signal generator 600 may operate at a timing set for each configuration in response to the control signal, the address signal ADDR, and/or the clock signal CLK provided from the timing generator 300.

The ramp signal generator 600 may operate in response to the ramp control signal RMP_CTRL provided from the timing generator 300. The ramp signal generator 600 may generate the ramp signal RMP having a slope set based on the ramp control signal RMP_CTRL. The generated ramp signal RMP may be compared with the pixel signal PXS.

The column array 500 may output the image data IDTA in response to a plurality of pixel signals PXS provided from the pixel array 100, the ramp signal RMP provided from the ramp signal generator 600, and a plurality of column selection signals CSEL[0] to CSEL[N−1]. The image data IDTA may include a plurality of pixel data values output in series.

The column array 500 may include a plurality of analog-to-digital converters 510 (hereinafter, referred to as ADCs) and an output buffer 540.

Each of the plurality of ADCs 510 may include a comparator 511 and a counter 512. For example, the comparator 511, which receives the pixel signal PXS from a corresponding column line of the plurality of column lines COL, and the counter 512, which is connected to an output of the comparator 511 that receives the pixel signal PXS, may configure one ADC 510. The ADC 510 may convert the pixel signal PXS received through the column line COL into the pixel data value PDV.

The comparator 511 may compare the received pixel signal PXS with the ramp signal RMP, and output the comparison result in a logic-low level or a logic-high level. The comparator 511 may generate a comparison result to which a correlated double sampling technique (hereinafter, referred to as CDS) is applied as a comparison signal CDS_OUT.

The plurality of pixel signals PXS output from the plurality of pixels 110 may have a deviation due to inherent characteristics (for example, fixed pattern noise (FPN) and the like) of each pixel 110 and/or a deviation due to a difference between characteristics of logics (for example, transistors for outputting photo-charges stored in a photoelectric conversion element in the pixel 110) for outputting the pixel signal PXS from the pixel 110. As such, correlated double sampling CDS may include generating a reset signal (or reset component) and a cell signal (or unit component) for the pixel signal PXS, and extracting a difference (for example, voltage difference) therebetween as a valid signal component to compensate for a deviation between the plurality of pixel signals PXS output through the plurality of column lines COL. The comparator 511 may output the comparison signal CDS_OUT, which is a signal for a comparison result to which the correlated double sampling technique is applied.

The counter 512 may count the comparison results output from the comparator 511. For example, the counter 512 may receive a counting clock C_CLK from the timing generator 300. The counter 512 may count the comparison results output from the comparator 511 in response to the counting clock C_CLK in a period in which a counting signal is activated, for example, the counting clock C_CLK is at a logic-high level. The counter 512 may count comparison results of a logic-high level or a logic-low level of the comparison signal CDS_OUT output from the comparator 511 in response to the counting clock C_CLK in a reset conversion section for sensing the reset signal and a signal conversion section for sensing the pixel signal PXS, and output the pixel data value PDV according to the counting result.

The output buffer 540 may temporarily store the plurality of pixel data values PDV output from the plurality of counters 512, and then amplify and output the stored pixel data values PDV. The output buffer 540 may receive the column selection signal CSEL and sequentially output the stored pixel data value PDV. The output buffer 540 may include a plurality of memories 520 and a sense amplifier 530.

After temporarily storing the pixel data values PDV output from the plurality of counters 512 respectively, the plurality of memories 520 may each generate a memory output signal Mem_out to enable the pixel data values PDV to be sequentially or selectively output to the sense amplifier 530.

The sense amplifier 530 may sense and amplify the received pixel data value PDV and output the amplified pixel data value. The sense amplifier 530 may output the plurality of amplified pixel data values PDV as the image data IDTA. The image data IDTA may be the plurality of pixel data values output in series.

The column circuit 550 may include the ADC 510 and the memory 520. For example, the column circuit 550 may include the ADC 510, which outputs the pixel data value PDV by performing an analog-to-digital conversion on the pixel signal PXS received from one column line COL of the plurality of column lines COL, and the memory 520, which stores the pixel data value PDV. As another example, the column circuit 550 may include the comparator 511, which compares the pixel signal PXS with the ramp signal RMP and outputs the comparison result in a logic-high level or a logic-low level, the counter 512, which counts the comparison result output from the comparator 511 in response to the counting clock C_CLK and outputs the pixel data value PDV, and the memory 520, which stores the output pixel data value PDV.

The memory 520 may be a configuration of the output buffer 540 and may be a configuration of the column circuit 550 at the same time. The plurality of column selection signals CSEL[0] to CSEL[N−1] may respectively correspond to the plurality of column circuits 550, and the plurality of column selection signals CSEL[0] to CSEL[N−1] may be signals to enable the pixel data values PDV stored in the memory 520 of the corresponding column circuit 550 to be sequentially output.

Referring to FIG. 2B, the column driver 400 may receive the clock signal CLK and the address signal ADDR provided from the timing generator 300, and may generate the column selection signals CSEL that are sequentially activated. The column driver 400 may include the clock tree 410 and the decoding circuit 420. The column driver 400 may further include a clock enable circuit 430.

The clock tree 410 may receive the address signal ADDR and the clock signal CLK provided from the timing generator 300, and may generate a plurality of delay clock signals D_CLK[0] to D_CLK[Q−1] that are provided to the decoding circuit 420 in response to the address signal ADDR and the clock signal CLK. The clock tree 410 may include at least two inverters 411, at least two first delay elements 412_1 to 412_R, and at least two second delay elements 4131 to 413_S.

The inverter 411 may receive the clock signal CLK, and may output the clock signal CLK to the plurality of first delay elements 412_1 to 412_R. A signal output from the inverter 411 may be a signal that is obtained by delaying the clock signal CLK. Although FIG. 2B illustrates two inverters 411 as an example, the clock tree 410 may include, e.g., three or more inverters.

The plurality of first delay elements 412_1 to 412_R may output first delay signals D1_CLK[0] to D1_CLK[R−1], which are divided into at least two signals, to the plurality of second delay elements 413_1 to 413_S, respectively. The plurality of first delay signals D1_CLK[0] to D1_CLK[R−1] may be output as signals obtained by delaying the signal provided from the inverter 411. FIG. 2B illustrates R first delay elements 4121 to 412_R. and R may be a natural number. The first delay signals D1_CLK[0] to D1_CLK[R−1] output from the plurality of first delay elements 412_1 to 412_R may be divided into at least two signals, or may be divided into R signals.

The plurality of second delay elements 413_1 to 413S may receive the first delay signals D1_CLK[0] to D1_CLK

[R−1], and may output the second delay signals D2_CLK[0] to D2_CLK[S−1], which may be divided into at least two signals, respectively. The second delay signals D2_CLK[0] to D2_CLK[S−1] may be obtained by delaying the first delay signals D1_CLK[0] to D1_CLK[R−1] provided from the first delay elements 412_1 to 412_R. FIG. 2B illustrates S second delay elements 413_1 to 413_S, and S may be a natural number greater than R. The second delay signals D_CLK[0] to D_CLK[S−1] output from the plurality of second delay elements 413_1 to 413_S may be divided into at least two signals or another number of signals.

The clock tree 410 may generate a plurality of delay clock signals D_CLK[0] to D_CLK[Q−1] using the second delay signals D2_CLK[0] to D2_CLK[S−1].

The above-described two groups of the first delay elements 412_1 to 412_R and the second delay elements 413_1 to 413_S may be configured to distribute the clock signal CLK to all of the plurality of column circuits 550. Since there is provided a hierarchical structure in which the second delay elements 413_1 to 413_S branch from the first delay elements 412_1 to 412_R, the single clock signal CLK may be received, and the delay clock signals D_CLK based on the received single clock signal CLK may be distributed hierarchically to the plurality of column circuits 550. FIG. 2B illustrates the two groups of the first delay elements 412_1 to 412_R and the second delay elements 413_1 to 413S, but the groups of delay elements may be increased and variously modified.

The decoding circuit 420 may receive the address signal ADDR (provided from the timing generator 300) and the delay clock signals D_CLK[0] to D_CLK[Q−1] (provided from the clock tree 410), and may select the column circuits 550 in units of columns.

The decoding circuit 420 may include a plurality of decoders 421_1 to 421_Q, which decode the input delay clock signals D_CLK in connection with the received address signal ADDR, and a plurality of flip-flops 422_11 to 422_QP, which latch output values of the delay clock signals D_CLK.

The plurality of decoders 421_1 to 421_Q may output signals for selecting some of the plurality of flip-flops 422_11 to 422_QP in response to the address signal ADDR. FIG. 2B illustrates Q decoders 421_1 to 421_Q, and Q may be a natural number greater than S and greater than or equal to the number of the second delay elements 413_1 to 413_S.

The plurality of flip-flops 422_11 to 422_QP may output the stored address signals ADDR stored in response to the plurality of delay clock signals D_CLK[0] to DCLK[Q−1] as the column selection signals CSEL[0] to CSEL[N−1]). For example, the plurality of flip-flops 422_11 to 422_QP may transmit the stored address signals ADDR to the column array 500 for one cycle of the delay clock signals D_CLK[0] to DCLK[Q−1] in the next cycle of the delay clock signals D_CLK[0] to DCLK[Q−1]. The transmitted address signals ADDR may be the column selection signals CSEL. Thus, the column selection signal CSEL may be a signal output from the flip-flop 422 selected by the decoder 421. The plurality of flip-flops 422_11 to 422_QP may output the plurality of column selection signals CSEL[0] to CSEL[N−1] to the corresponding column circuit 550. FIG. 2B illustrates P×Q flip-flops 422_11 to 422_QP, where P and Q may be natural numbers of 2 or greater, P may be equal to the number of flip-flops 422 connected to one decoder 421, and Q may be equal to the number of delay clock signals DCLK[0] to DCLK[Q−1].

FIGS. 2A and 2B illustrate N column selection signals CSEL[0] to CSEL[N−1], and N may be any number and may be equal to the number P×Q of the flip-flops 422. For example, P flip-flops 422_1 to 422_1P may be connected to one decoder 4211, and P flip-flops 422_Q1 to 422_QP may be connected to another decoder 421_Q.

The clock enable circuit 430 may receive the clock signal CLK and the address signal. The clock enable circuit 430 may generate a clock enable signal CLK_EN that includes a first clock enable signal CLK_EN_A (for selecting at least one of the plurality of first delay elements 412_1 to 412_R) and a second clock enable signal CLK_EN_B (for selecting at least one of the plurality of second delay elements 413_1 to 413_S). The clock enable signal CLK_EN may selectively enable the plurality of first delay elements 412_1 to 412_R and/or the plurality of second delay elements 413_1 to 413_S. For example, the clock enable circuit 430 may generate the first clock enable signal CLK_EN_A for enabling only the selected first delay element and disabling the unselected first delay elements among the plurality of first delay elements 412_1 to 412_R. For example, the clock enable circuit 430 may generate the second clock enable signal CLK_EN_B for enabling only the selected second delay element and disabling the unselected second delay elements among the plurality of second delay elements 412_1 to 412_R. Although FIG. 2B illustrates two signals of the first clock enable signals CLK_EN_A and the second clock enable signals CLK_EN_B, the clock enable signals may be increased according to the number of groups of the first delay elements 412_1 to 412_R and the second delay elements 413_1 to 413_S or variously modified. The clock enable circuit 430 may have a structure of a decoder or may be implemented in various forms.

According to an example embodiment, output timing of the pixel data value PDV may be synchronized by hierarchically distributing the delay clock signals D_CLK based on the clock signal CLK to the column array.

In addition, because the clock enable circuit 430 uses a clock tree to which a clock gating technique for disabling at least one of the first delay element 412 and the second delay element 413 is applied, the clock tree may be partially deactivated, and thus, power consumption of the clock tree may be reduced.

Figure 3A:
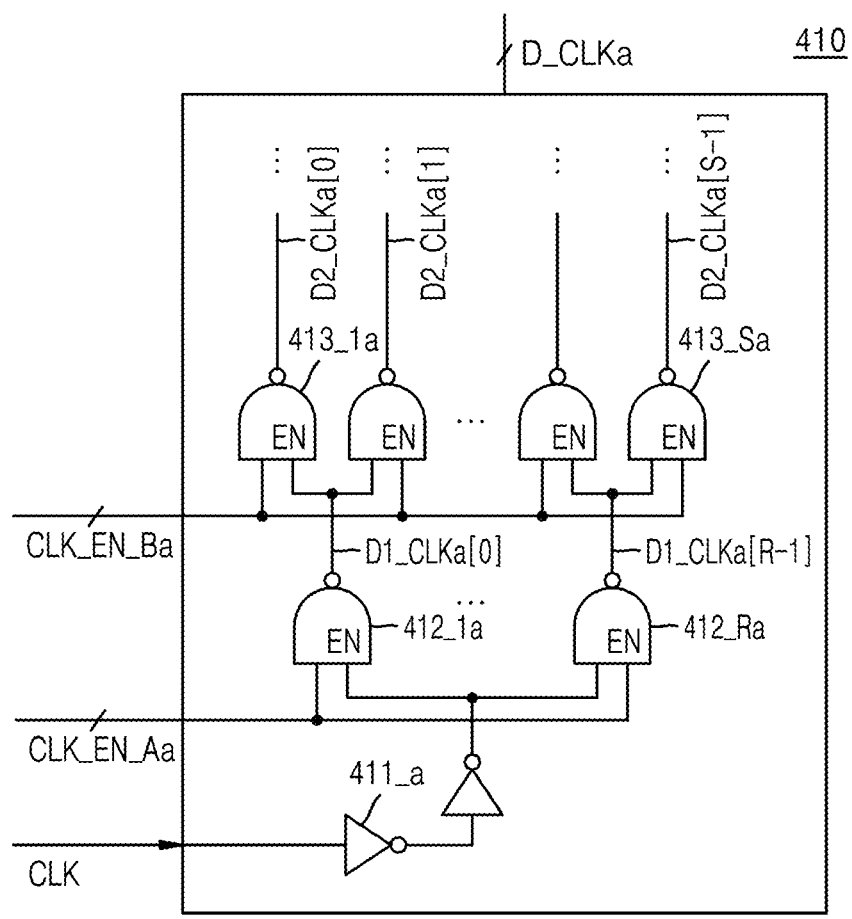
FIGS. 3A and 3B illustrate circuit diagrams of an embodiment of a clock tree applied to an image sensor according to an example embodiment.
Figure 3B:
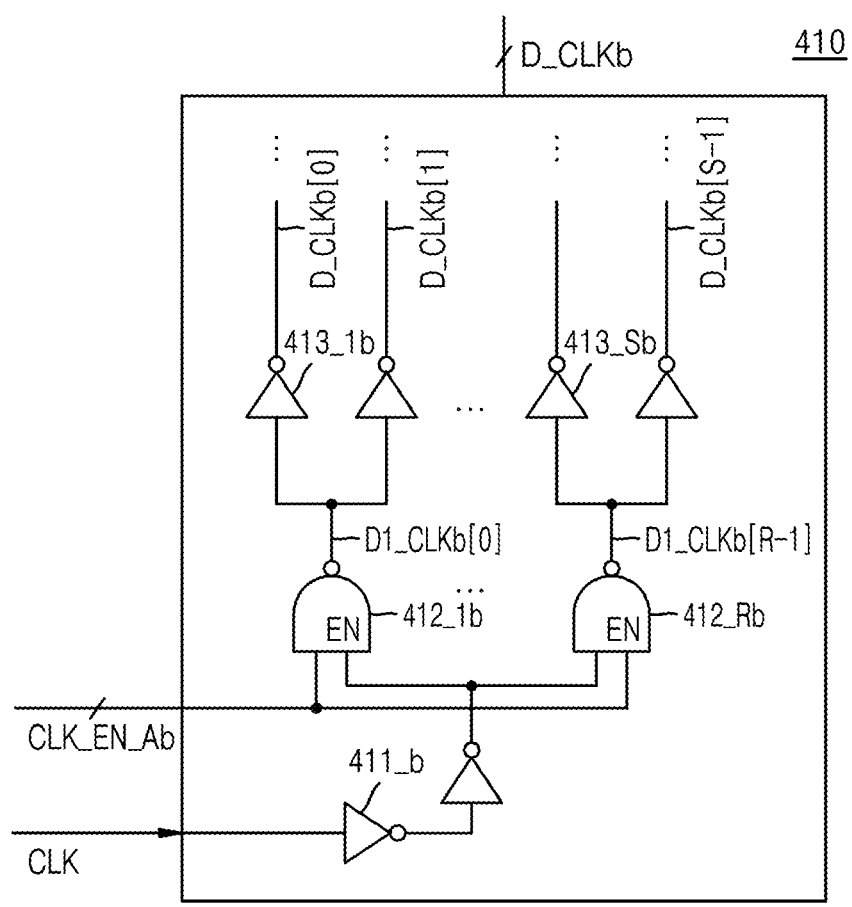

FIGS. 3A and 3B are circuit diagrams illustrating an embodiment of a clock tree applied to an image sensor according to an example embodiment.

Referring to FIG. 3A, a clock tree 410_a may include a plurality of inverters 411_a, a plurality of first delay elements 412_1a to 412_Ra, and a plurality of second delay elements 413_1a to 413_Sa.

The plurality of first delay elements 412_1a to 412_Ra may be logic elements, and may generate the first delay signals D1_CLKa[0] to D1_CLKa[R−1] divided into at least two signals in response to a first clock enable signal CLK_EN_Aa.

The second delay elements 413_1a to 413_Sa may be logic elements, and may generate the second delay signals D2_CLKa[0] to D2_CLKa[S−1] divided into at least two signals in response to a second clock enable signal CLK_EN_Ba. For example, the plurality of second delay elements 413_1a to 413_Sa may delay phases of the first delay signals D1_CLKa[0] to D1_CLKa[R−1] received from the plurality of first delay elements 412_1a to 412_Ra, respectively.

A plurality of delay clock signals D_CLKa may be generated in response to the second delay signals D2_CLKa[0] to D2_CLKa[S−1]. Thus, the plurality of second delay elements 413_1a to 413_Sa may output delayed signals as delay clock signals D_CLK[0] to D_CLK[N−1].

At least one of the plurality of first delay elements 412_1a to 412_Ra or the plurality of second delay elements 413_1a to 413_Sa may be configured by a logic gate or may be configured by a NAND gate (the NAND gate is an example of a logic element and can be replaced with another kind of logic element). Although FIG. 3A illustrates that the plurality of first delay elements 412_1a to 412_Ra and the plurality of second delay elements 413_1a to 413 to Sa are all NAND gates, the delay elements are not limited thereto and may be configured by logic gates of various forms.

At least one of the first delay elements 412_1a to 412_Ra may be selected and enabled by the first clock enable signal CLK_EN_Aa, and unselected delay elements thereof may be disabled. At least one of the second delay elements 412_1a to 412_Sa may be selected and enabled by the second clock enable signal CLK_EN_Ba, and unselected delay elements thereof may be disabled.

Referring to FIG. 3B, at least one of a plurality of first delay elements 412_1b to 412_Qb may be configured by a NAND gate, and at least one of a plurality of second delay elements 413_1b to 413_Sb may be configured by an inverter. Although FIG. 3B illustrates that the first delay elements 412_b are all NAND gates and the second delay elements 413_b are all inverters, the delay elements may be implemented in various forms. Although FIGS. 3A and 3B illustrate two groups of the first delay elements 412_1 to 412_R and the second delay elements 413_1 to 413_S, the delay elements may be increased or variously modified. Although FIGS. 3A and 3B illustrate that the clock trees 410_a and 410_b include two groups, for example, a first group configured by the first delay elements 4121 to 412_R and a second group configured by the second delay elements 413_1 to 413S, the clock trees may include three or more groups. For example, the clock trees 410_a and 410_b may further include a plurality of third delay elements that operate in response to the delay clock signals output from the plurality of second delay elements 413_1b to 413_Sb. The first delay element and the second delay element may be configured by a NAND gate, the third delay element may be configured by an inverter, and the clock enable signal CLK_EN may control the first and second delay elements 412 and 413.

As described above, the delay signals D1_CLK, or D2_CLK, which are bifurcated into two, are signals in which each of the signals is not toggled in "all" time domains, and output delay signals are "different in timing" for each index. In other words, delay signals can mean signals that partially toggle the clock tree for clock gating. Thus, the NAND gate/inverter represented in FIG. 3A or 3B can divide the input clock signal every certain time, and can generate at least two branched signals for selectively toggling the divided signal. For example, the logic gate of the first stage included in the clock tree illustrated in FIG. 3A or 3B may divide the toggled clock signal CLK (which is toggled in all time domains) into R(number) (412_1a to 412_Ra), and the logic gate of the second stage may divide the signal divided into R into at least two.

Figure 4:
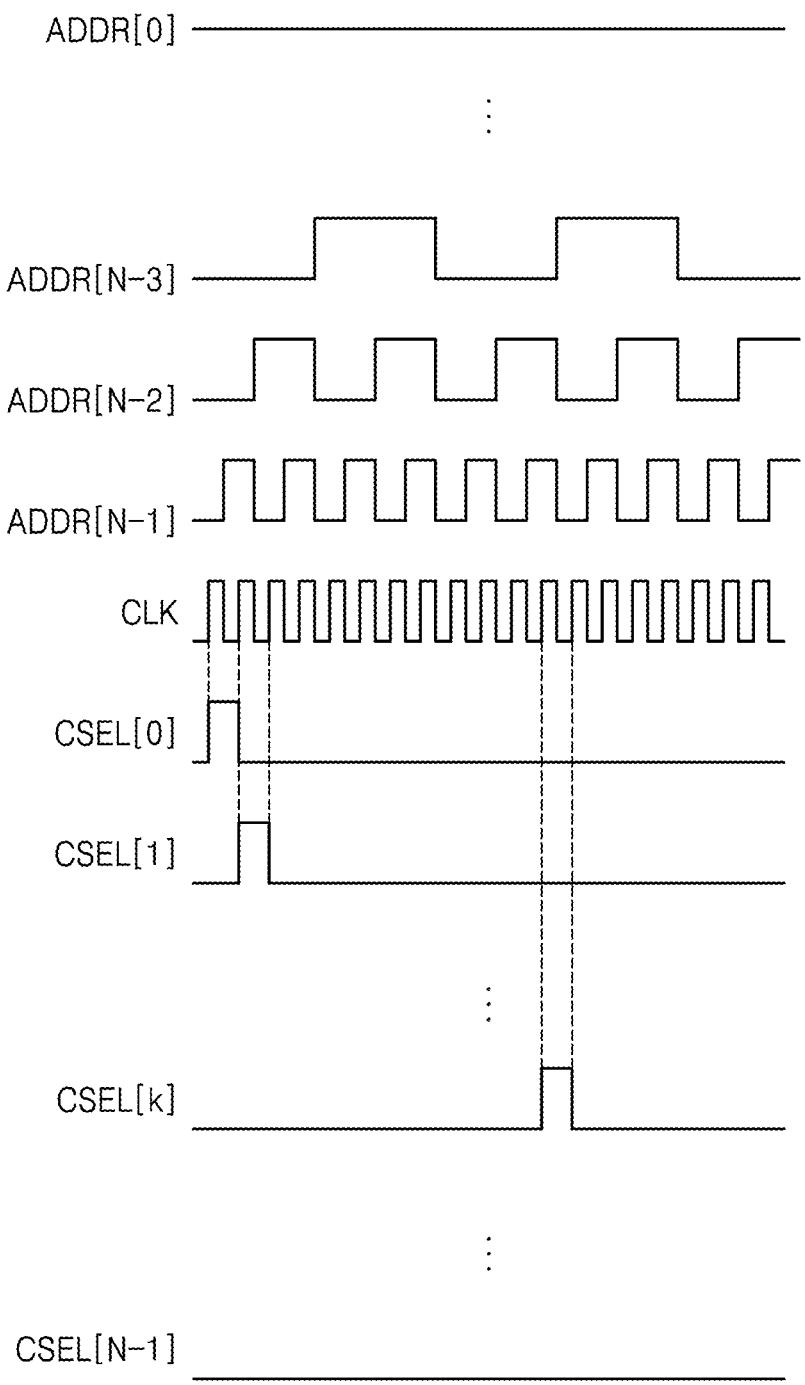
FIGS. 4, 5B, 6, and 7 illustrate waveform diagrams of various operation examples of an image sensor according to an example embodiment.
Figure 5A:
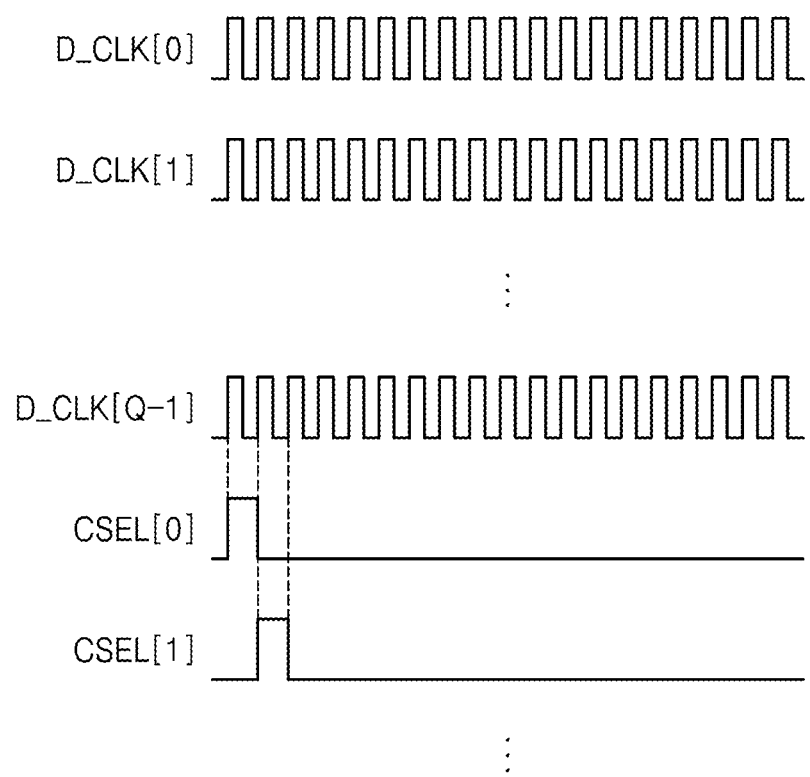
FIG. 5A is a waveform diagram according to a comparative example.

FIGS. 4, 5B, 6, and 7 are waveform diagrams illustrating various operation examples of an image sensor according to an example embodiment, and FIG. 5A is a waveform diagram according to a comparative example. FIGS. 4, 5B, 6, and 7 are waveform diagrams according to operation examples of the image sensor of FIG. 2. In FIGS. 4, 5A, 5B, 6, and 7, the horizontal axes represent time and the vertical axes represent a logic-high level or a logic-low level of a signal.

Referring to FIG. 4, a plurality of address signals ADDR[0] to ADDR[N−1] may have N different timings.

The clock signal CLK may be generated by the timing generator 300 and transmitted to the column driver 400. The transmitted clock signal CLK may be supplied to the clock tree 410 of the column driver 400. The clock tree 410 may output the received clock signal CLK to the decoding circuit 420 as a plurality of delay clock signals D_CLK[0] to D_CLK[Q−1].

The decoding circuit 420 may decode the address signal ADDR to generate the column selection signals CSEL[0] to CSEL[N−1]. The column selection signals CSEL[0] to CSEL[N−1] may be stored in the plurality of flip-flops 422_11 to 422QP and then output in response to the delay clock signals D_CLK[0] to D_CLK[Q−1] provided to the plurality of flip-flops 422_11 to 422QP, respectively.

The decoding circuit 420 may output the column selection signal CSEL in response to a rising edge (or a falling edge) of the clock signal CLK. Accordingly, the decoding circuit 420 may output the column selection signal CSEL for a time corresponding to one cycle of the clock signal CLK. For example, the column selection signal CSEL[0] for selecting the first column circuit 550 may be output for a time corresponding to a first cycle of the clock signal CLK, the column selection signal CSEL[1] for selecting the second column circuit 550 may be output for a time corresponding to a second cycle of the clock signal CLK, the column selection signal CSEL[k−1] for selecting the k-th column circuit 550 may be output for a time corresponding to a k-th cycle of the clock signal CLK, and the column selection signal CSEL[N−1] for selecting the N-th column circuit 550 may be output for a time corresponding to an N-th cycle of the clock signal CLK. At this time, k may be a natural number less than N.

Figure 5B:
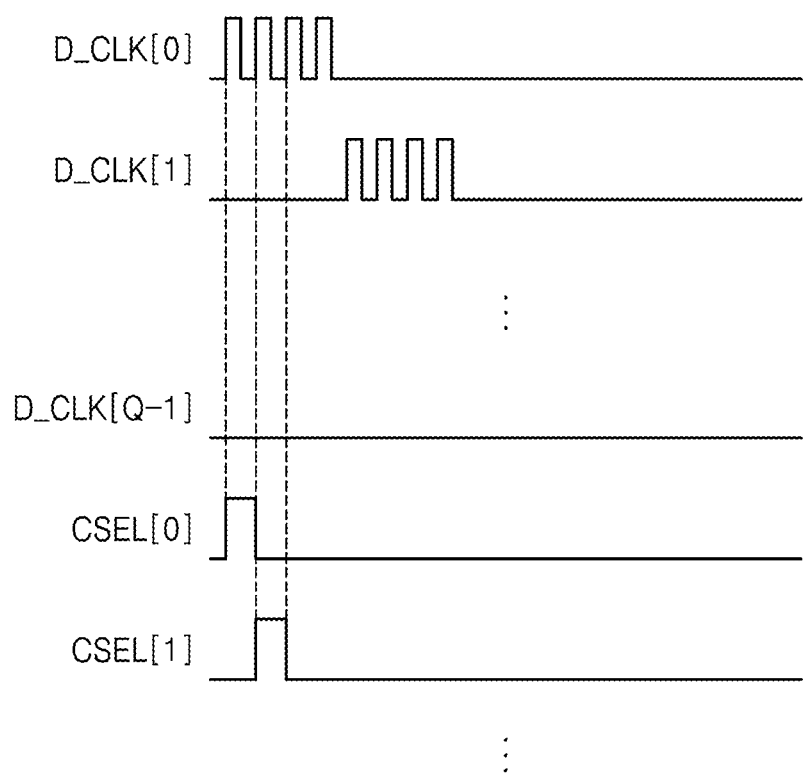

FIG. 5A is a waveform diagram according to a comparative example in which the clock enable circuit 430 is not included in a column driver. FIG. 5B is the waveform diagram when the clock enable circuit 430 according to an example embodiment is included in the column driver 400.

The comparative example of FIG. 5A illustrates Q delay clock signals D_CLK[0] to D_CLK[Q−1] and N column selection signals CLK[0] to CLK[N−1] output in response to the delay clock signals D_CLK[0] to D_CLK[Q−1]. Here, the Q delay clock signals D_CLK[0] to D_CLK[Q−1] may be toggled in all time domains. For example, the column selection signal CSEL[0] for selecting a first column circuit is output for a time corresponding to a first cycle of the Q-th delay clock signal D_CLK[Q−1], and the column selection signal CSEL[1] for selecting a second column circuit may be output for a time corresponding to a second cycle of the Q-th delay clock signal D_CLK[Q].

Referring to FIG. 5B, the Q delay clock signals D_CLK[0] to D_CLK[Q−1] are not necessarily toggled in all time domains, and timings of the delay clock signals that are output are different for each index. Thus, the Q delay clock signals D_CLK[0] to D_CLK[Q−1] are toggled with different time intervals. For example, the plurality of flip-flops 422_1 to 422_Q may sequentially output the address signals ADDR respectively as the column selection signals CSEL in response to the corresponding delay clock signals D_CLK[0] to D_CLK[Q−1]. The remaining delay clock signals D_CLK[1] to D_CLK[Q−1] may not be toggled at a time when the first delay clock signal D_CLK[0] operates.

Despite operating in different time intervals, the column selection signal CSEL[0] for selecting the first column circuit 550 may be output for a time corresponding to the first cycle of the first delay clock signal D_CLK[0], and the column selection signal CSEL[1] for selecting the second column circuit 550 may be output for a time corresponding to the second cycle of the first delay clock signal D_CLK[0] (which is the same as in FIG. 5A when the clock enable circuit is not included in the column driver). Although FIG. 5B illustrates the column selection signals CSEL as a result of applying the address signal corresponding to the address signal ADDR[2] to the clock enable circuit 430 for the sake of convenience of description, the clock enable circuit 430 may generate different waveform diagrams by receiving various address signals ADDR[0] to ADDR[N−1].

Referring to FIGS. 5A and 5B, the delay clock signals D_CLK may be toggled in all time domains in FIG. 5A but may be toggled only in a selected time domain in FIG. 5B. The column selection signal CSEL is the same in FIGS. 5A and 5B. Thus, according to an example embodiment as shown in FIG. 5B, the image sensor including the clock enable circuit 430 in the column driver 400 may allow for reduced power consumption for a clock operation.

Figure 6:
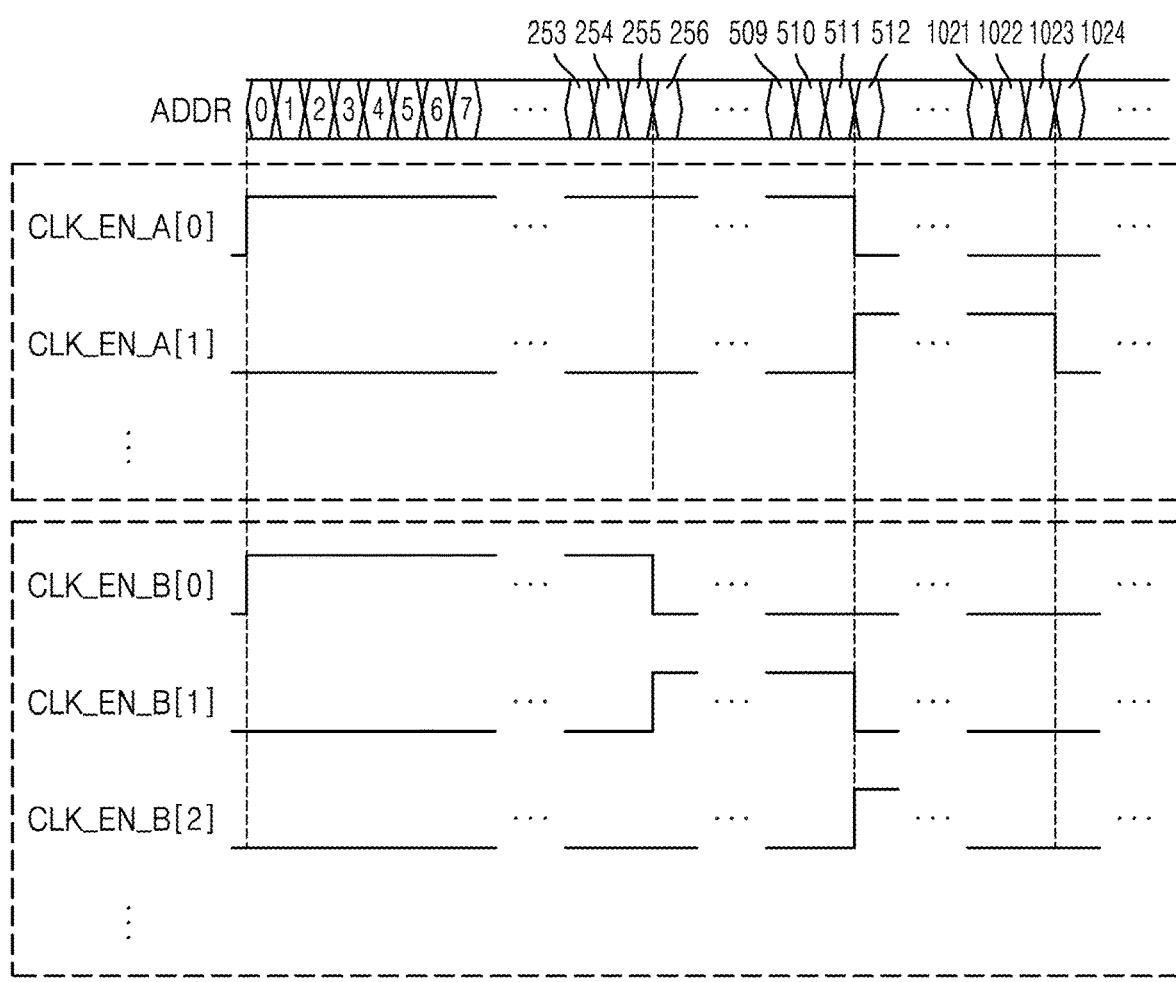
Figure 7:
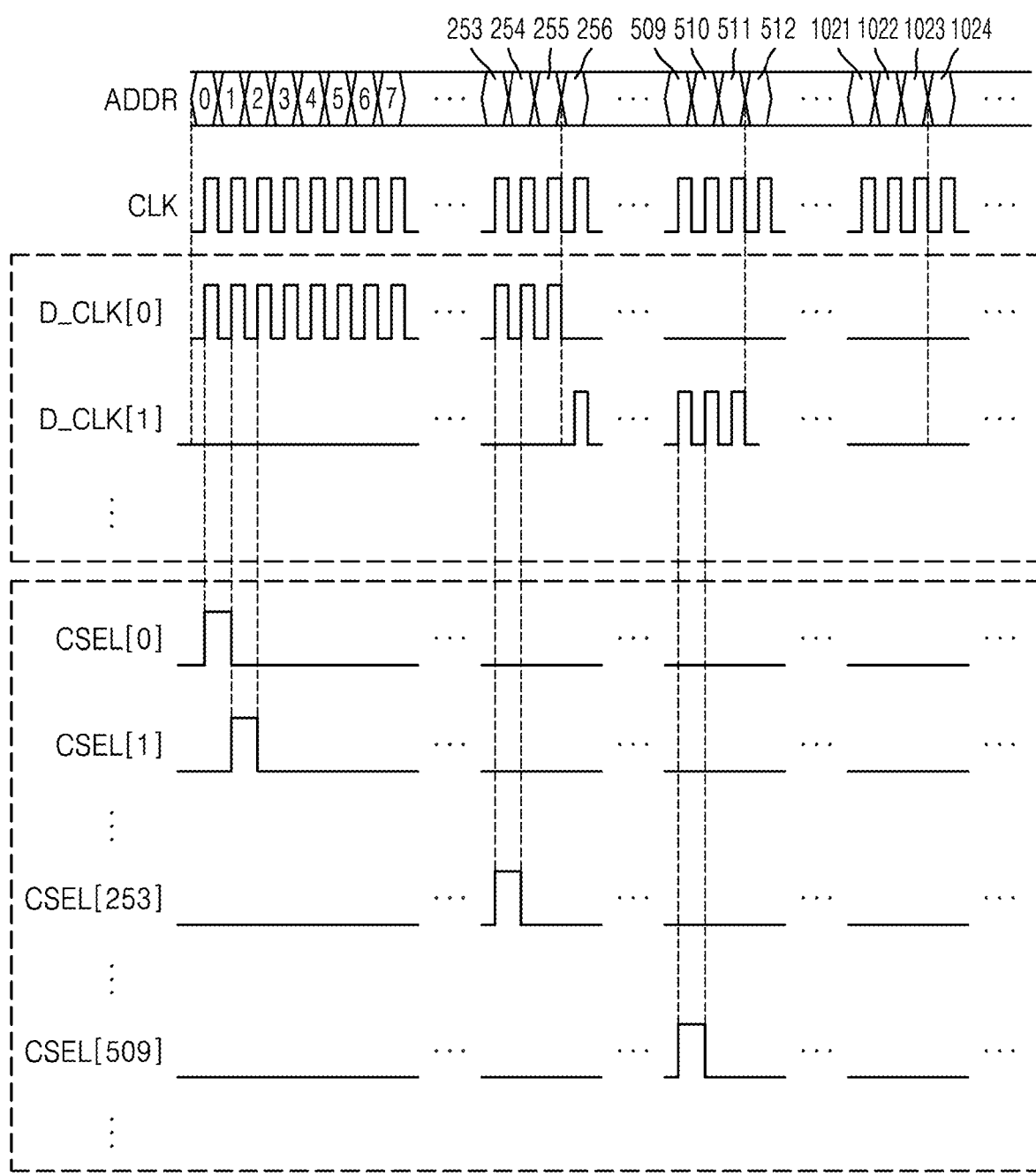

Referring to FIGS. 6 and 7, the plurality of address signals ADDR[0] to ADDR[N−1] may be signals having N different timings. Although FIGS. 6 and 7 illustrate address signals applied to 256 flip-flops 422, the address signals may be variously changed. Description will be made by assuming the address signals applied to 256 flip-flops 422.

Referring to FIG. 6, when the address signal ADDR[0] (having an index 0 among the address signals ADDR[0] to ADDR[255] provided to the 256 flip-flops 422) is applied to the clock enable circuit 430, only the first clock enable signal CLK_EN_A[0] may be enabled among the plurality of first clock enable signals CLK_EN_A[0] to CLK_EN_A[R−1] for controlling the plurality of first delay elements 412_1 to 412_R.; the first clock enable signals CLK_EN_A[1] to CLK_EN_A[R−1] of the remaining indexes may be disabled. At the same time, only the second clock enable signal CLK_EN_B[0] (having an index 0) may be enabled among the plurality of second clock enable signals CLK_EN_B[0] to CLK_EN_B[Q−1] for controlling the plurality of second delay elements 413_1 to 413_S; the second clock enable signals CLK_EN_B[1] to CLK_EN_B[Q−1] of the remaining indexes may be disabled.

At the time when the address signal ADDR[256] of an index 256 is applied to the clock enable circuit 430, the first clock enable signal CLK_EN_A[0] of the index 0 among the plurality of first clock enable signals CLK_EN_A[0] to CLK_EN_A[R−1] for controlling the plurality of first delay elements 412_1 to 412_R may be enabled, and a disabled state of the first clock enable signals CLK_EN_A[1] to CLK_EN_A[R−1] of the remaining indexes may be maintained. At the same time, the second clock enable signal CLK_EN_B[0] of the index 0 among the plurality of second clock enable signals CLK_EN_B[0] to CLK_EN_B[Q−1] for controlling the plurality of second delay elements 413_1 to 413_S transitions from an enabled state to a disabled state, the second clock enable signal CLK_EN_B[1] of an index 1 transitions from the disabled state to the enabled state, and the disabled state of the second clock enable signals CLK_EN_B[2] to CLK_EN_B[Q−1] of the remaining indexes may be maintained.

At the time when the address signal ADDR[512] of an index 512 is applied, the first clock enable signal CLK_EN_A[0] of the index 0 among the plurality of first clock enable signals CLK_EN_A[0] to CLK_EN_A[R−1] for controlling the plurality of first delay elements 4121 to 412R transitions from the enabled state to the disabled state, the first clock enable signal CLK_EN_A[1] of the index 1 transitions from the disabled state to the enabled state, and the disabled state of the first clock enable signals CLK_EN_A[2] to CLK_EN_A[R−1] of the remaining indexes may be maintained. At the same time, the second clock enable signal CLK_EN_B[0] of the index 0 among the plurality of second clock enable signals CLK_EN_B[0] to CLK_EN_B[Q−1] for controlling the plurality of second delay elements 413_1 to 413_S maintains the disabled state, the second clock enable signal CLK_EN_B[1] of the index 1 transitions from the enabled state to the disabled state, the second clock enable signal CLK_EN_B[2] of an index 2 transitions from the disabled state to the enabled state, and the second clock enable signals CLK_EN_B[3] to CLK_EN_B[Q−1] of the remaining indexes may maintain the disabled state.

FIG. 7 illustrates timings of the plurality of address signals ADDR[0] to ADDR[N−1] applied to the column driver 400, the plurality of delayed clock signals D_CLK[0] to D_CLK[Q−1] that are outputs of the clock tree 410 according to the clock signal CLK, and a plurality of column selection signals CSEL[0] to CSEL[N−1] that are outputs of the decoding circuit 420.

When the address signal ADDR[0] of the index 0 among the address signals ADDR[0] to ADDR[255] provided to the 256 flip-flops 422 is applied to the clock enable circuit 430, since the first clock enable signal CLK_EN_A[0] of the index 0 and the second clock enable signal CLK_EN_B[0] of the index 0 are enabled (see FIG. 6), the delay clock signal D_CLK[0] of the index 0 among the delay clock signals D_CLK[0] to D_CLK[Q−1] that are outputs of the clock tree 410 is toggled at the same cycle as the clock signal CLK, and the delay clock signals D_CLK[1] to D_CLK[Q−1] of the remaining indexes are not toggled. At the same time, the plurality of column selection signals CSEL[0] to CSEL[255] output from the 256 flip-flops 422_1 to 422_256 may be sequentially output to the column array 500 every one cycle of the delay clock signal D_CLK[0] of the index 0.

When the address signal ADDR[256] of the index 256 is applied to the clock enable circuit 430, the first clock enable signal CLK_EN_A[0] of the index 0 maintains the disabled state, the second clock enable signal CLK_EN_B[0] of the index 0 is disabled, the second clock enable signal CLK_EN_B[1] of the index 1 is enabled (see FIG. 6), and thus, the delay clock signal D_CLK[1] of the index 1 among the delay clock signals D_CLK[0] to D_CLK[Q−1] that are outputs of the clock tree 410 operates at the same cycle as the clock signal CLK, and the delay clock signals D_CLK[0] and D_CLK[2] to D_CLK[Q−1] of the remaining indexes do not operate. At the same time, the plurality of column selection signals CSEL[257] to CSEL[512] output from the 256 flip-flops 422_257 to 422_512 may be sequentially output to the column array 500 every one cycle of the delay clock signal D_CLK[1] of the index 1.

Although FIGS. 6 and 7 illustrate that two second delay elements 413_1 to 413_S branch from the first delay elements 412_1 to 412_R for the sake of convenient description, the number of second delay elements may be any number.

Figure 8:
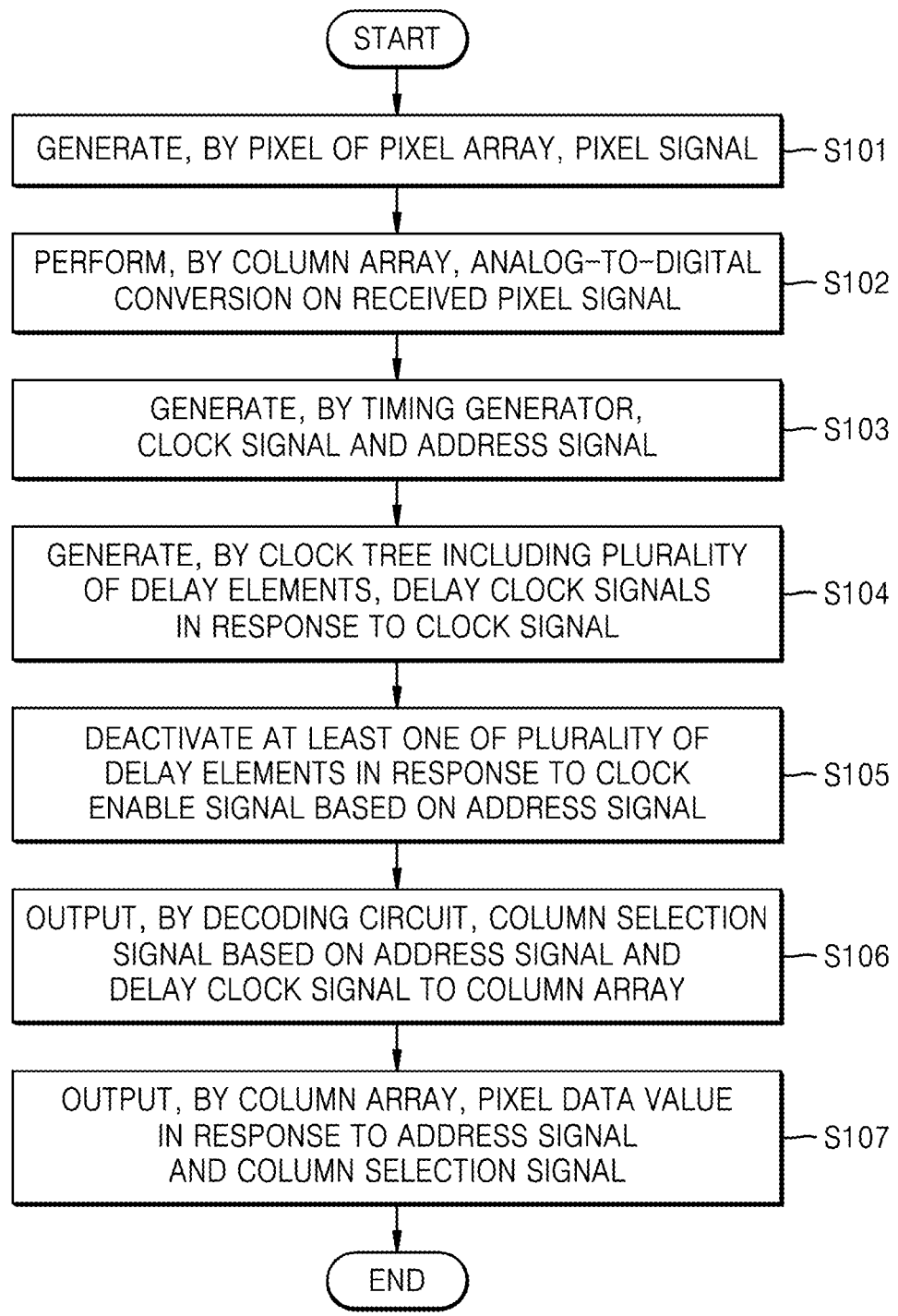
FIG. 8 illustrates a flowchart of a method of operating an image sensor according to an example embodiment.

FIG. 8 is a flowchart illustrating a method of operating an image sensor according to an example embodiment.

The method illustrated in FIG. 8 may be used to operate the image sensor of FIG. 2. Accordingly, the above description made with reference to FIG. 2 may be applied to the present embodiment. For example, operations of the pixel 110, the timing generator 300, the clock tree 410, the decoding circuit 420, the clock enable circuit 430, and the column array 500 of the image sensor 10 may be as described above.

Referring to FIG. 8, each of the plurality of pixels 110 may sense light using a light sensing element, and may generate the pixel signal PXS obtained by converting the sensed light into an electrical signal (S101).

Thereafter, the column array 500 may perform an analog-to-digital conversion in response to the pixel signal PXS received through the column line COL (S102).

Thereafter, the timing generator 300 may generate the clock signal CLK and the address signal ADDR (S103). The generated clock signal CLK and the address signal ADDR may be output to the column driver 400.

Thereafter, the clock tree 410 including the plurality of first delay elements 412 and the plurality of second delay elements 413 may generate the delay clock signals D_CLK in response to the clock signal CLK (S104).

Thereafter, at least one of the plurality of first delay elements 412 and the plurality of second delay elements 413 may be deactivated or activated in response to the clock enable signal CLK_EN based on the address signal ADDR (S105). The column driver 400 may further include the clock enable circuit 430, and in this case, the clock enable circuit 430 may generate the clock enable signal for selecting at least one of the first or second delay elements 412 or 413 in response to the address signal ADDR.

Thereafter, the decoding circuit 420 may output the column selection signal CSEL based on the address signal ADDR and the delay clock signals D_CLK to the column array 500 (S106).

Thereafter, the column array 500 may output the plurality of pixel data values IDTA in response to the address signal ADDR and the column selection signal CSEL.

In an embodiment, if the column driver 400 further includes an address logic 440, the clock signal CLK and the address signal ADDR may be applied to the address logic, and an address output signal ADDR_OUT may control the column driver 400.

Figure 9:
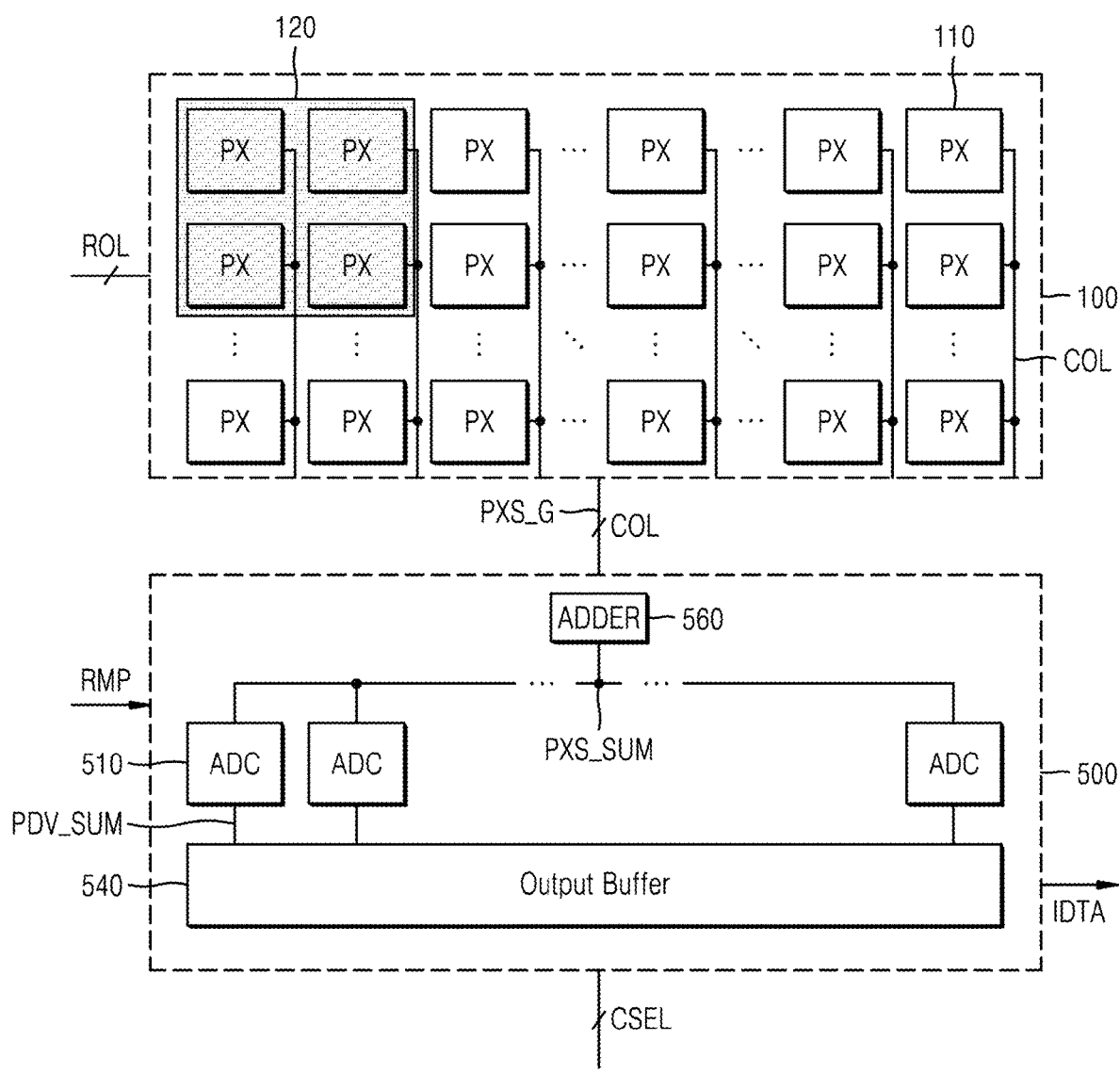
FIG. 9 illustrates a circuit diagram of an image sensor according to an example embodiment.

FIG. 9 is a circuit diagram of an image sensor according to an example embodiment.

Referring to FIG. 9, the pixel array 100 may include a plurality of pixel groups 120 configured by an M×N matrix (M or N is a 2 or a greater natural number). A plurality of pixel signals PXS_G generated by the plurality of pixel groups 120 may be output to the column array 500.

A configuration of the column array 500 may be the same as the configuration of the column array 500 of FIG. 2 except that the column array 500 of FIG. 9 may further include an adder 560 as compared to the column array 500 of FIG. 2. In the example embodiment illustrated in FIG. 9, the plurality of pixel signals PXS_G (generated by the pixel groups 120) are added together by the adder 560 to generate a sum pixel signal PXS_SUM. The sum pixel signal PXS_SUM may be converted into a sum data value PDV_SUM by the ADC 510. The sum data values PDV_SUM may be sequentially output by the output buffer 540 in response to the column selection signal CSEL. A value output by the output buffer 540 may be a part of the image data IDTA.

Referring to FIG. 9, the sum pixel signal PXS_SUM, (which is the sum of the pixel signals PXS_G generated by the pixel groups 120) may have a high signal-to-noise ratio (SNR), such that noise is less of an issue. According to the present example embodiment, when an analog-to-digital converted of the sum pixel signal PXS_SUM is performed, the noise may be reduced and image data IDTA with a high resolution may be generated.

When the analog-to-digital conversion of the sum pixel signal PXS_SUM is performed by any one ADC 510 of the plurality of ADCs 510, another ADC 510 may be idle. Control of the idle ADC 510 will be described below with reference to FIG. 11.

Although FIG. 9 illustrates a 2×2 matrix, M or N may be 2 or a greater natural number.

Figure 10:
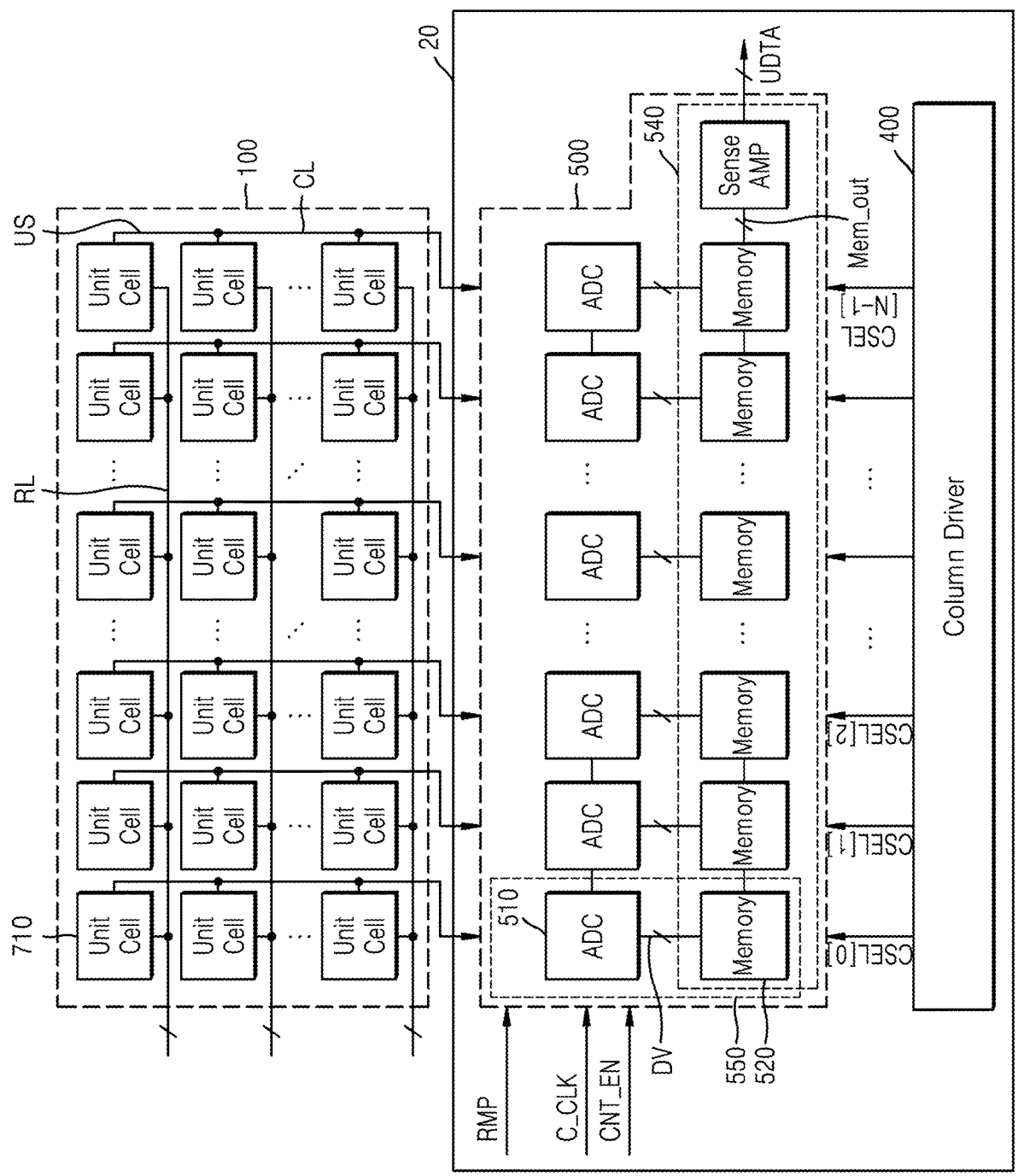
FIGS. 10 and 11 illustrate circuit diagrams of a semiconductor device including an address decoder according to an example embodiment.
Figure 11:
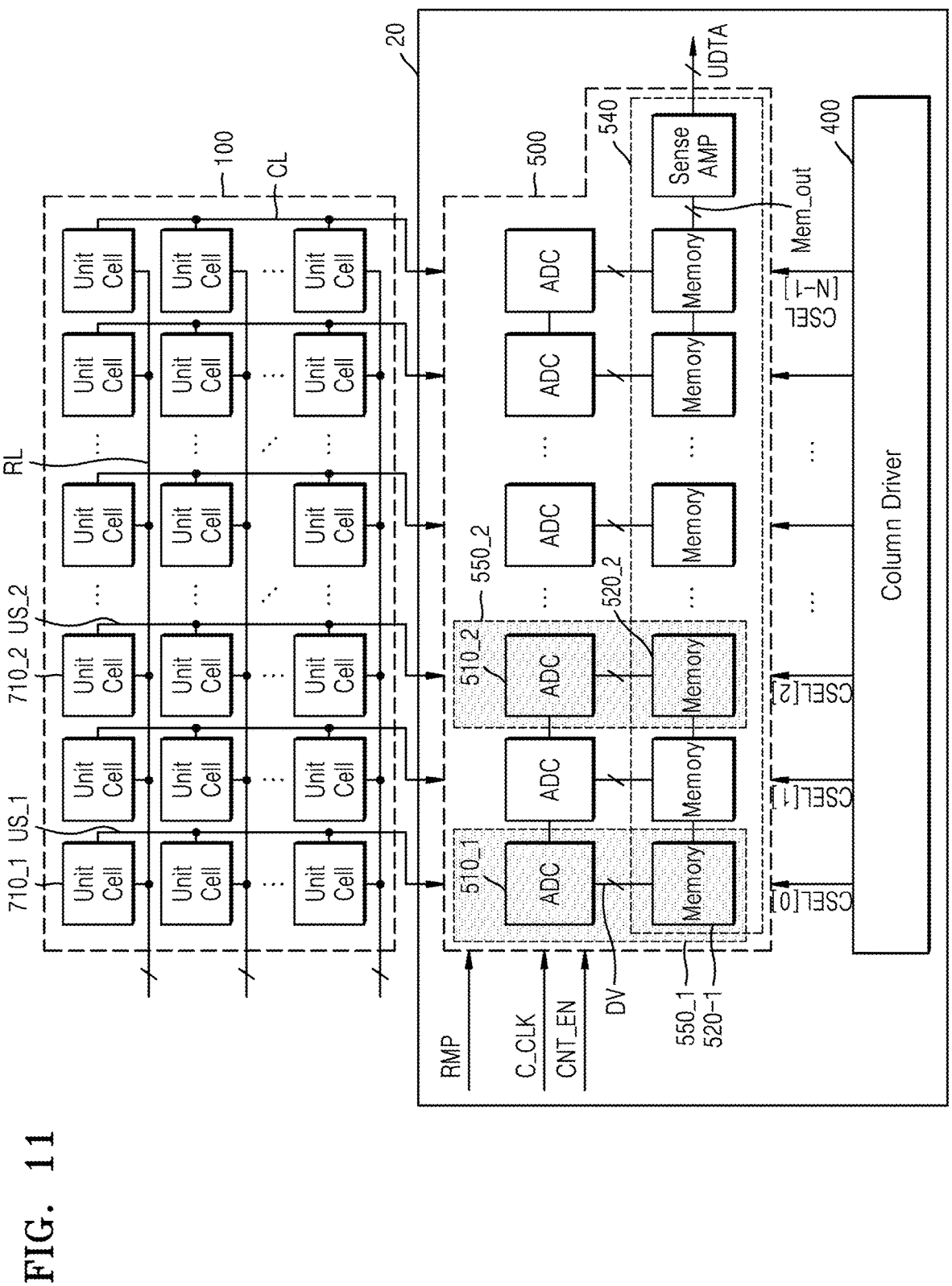

FIGS. 10 and 11 are diagrams illustrating a semiconductor device including an address decoder according to an example embodiment.

Referring to FIG. 10, an address decoder 20 according to an example embodiment includes the column driver 400 and the column array 500. A semiconductor device including the address decoder 20 may further include a cell array 700. The cell array 700 may include a plurality of row lines RL, a plurality of column lines CL, and a plurality of unit cells 710 that are arranged in a matrix and connected to the row lines RL and the column lines CL. Each of the unit cells 710 may be a pixel that performs a function of a photoelectric conversion element that converts light into an electrical signal, or a nonvolatile memory that stores data in a nonvolatile manner, or a volatile memory that uses a refresh operation.

The column array 500 may include the plurality of analog-to-digital converters 510 (ADCs) and the output buffer 540.

The ADC 510 may convert the cell signal US received through the column line CL into a digital value DV.

The output buffer 540 may temporarily store a plurality of digital values DV provided through the plurality of column lines CL, and then amplify the stored digital values DV and sequentially output the amplified values. The output buffer 540 may include the plurality of memories 520.

The column circuit 550 may include the ADCs 510 and the memories 520. The column circuit 550 may include the ADC 510, which performs an analog-to-digital conversion of a cell signal US received from one column line CL of the plurality of column lines CL to outputs the digital value DV, and the memory 520, which stores the digital value DV. The memory 520 may have a configuration of the output buffer 540 and may have a configuration of the column circuit 550 at the same time.

The configuration and operation of the clock tree 410, the decoding circuit 420, and the clock enable circuit 430 of the column driver 400 may be the same as those of FIG. 2, and thus redundant descriptions thereof may be omitted.

The column driver 400 may further include the address logic. The address logic may receive the address signal ADDR and the address control signal ADDR_CTRL, and may generate the address output signal ADDR_OUT output to the clock tree 410 and the decoding circuit 420.

The address control signal ADDR_CTRL may be the same as a counter enable signal CNT_EN provided to the ADC 510. For example, the address control signal ADDR_CTRL may go to a logic-high level to perform counting while the ramp signal RMP ramps.

The address output signal ADDR_OUT may be a signal for deactivating some of the plurality of decoders 421_1 to 421_Q of the decoding circuit 420 to reduce a voltage change during the analog-to-digital conversion performed by the ADC 510. The address output signal ADDR_OUT may be a signal that does not generate the address signal ADDR while the analog-digital conversion is performed.

An operation of the address decoder 20 including the address logic according to an example embodiment will be described in detail with reference to FIGS. 12, 13A, and 13B.

FIG. 11 illustrates an operation of a semiconductor device including the address decoder according to an example embodiment, which may be understood with reference to FIG. 10.

Referring to FIG. 11, a first cell signal US_1 generated by a first unit cell 710_1 and a second cell signal US_2 generated by a second unit cell 710_2 among the unit cells 710 of the cell array 700 may be output to the column array 500 through the column line CL. The first cell signal US_1 and the second cell signal US_2 may be summed by the column array 500. The summed cell signal US_SUM may be applied to the first ADC 510_1 located at the first column circuit 550_1, an analog-to-digital conversion of the cell signal may be performed, and a digital value converted from the cell signal may be stored in the memory 520_1 located at the first column circuit 550_1. At this time, the summed cell signal US_SUM may not be applied to the second ADC 510_2 located at the second column circuit 550_2, and the second memory 520_2 may not store the digital value. Accordingly, the output buffer 540 may read only the value stored in the first memory 520_1 and may not read the value stored in the second memory 520_2.

The address logic 440 may receive the address signal ADDR and the address control signal ADDR_CTRL to generate the address output signal ADDR_OUT for controlling the column selection signal CSEL[0] corresponding to the first column circuit 550_1 to be enabled and the column selection signal CSEL[2] corresponding to the second column circuit 550_2 to be disabled.

The address output signal ADDR_OUT may control deactivation of a part of a decoder and a clock tree corresponding to the second column circuit 550_2. The address output signal ADDR_OUT may be applied to the clock tree 410 and the decoding circuit 420. An operation of the address decoder 20 according to an example embodiment will be described in detail below with reference to FIGS. 12, 13A, and 13B.

Although FIG. 11 illustrates that the first unit cell 710_1 is not adjacent to the second unit cell 710_2 and one column is interposed therebetween, two or more columns may be interposed therebetween. Since the remaining configurations and operations of the clock tree 410, the decoding circuit 420, the clock enable circuit 430, and the address logic of the column driver 400 are the same as illustrated in FIG. 10, redundant descriptions thereof will be omitted.

Figure 12:
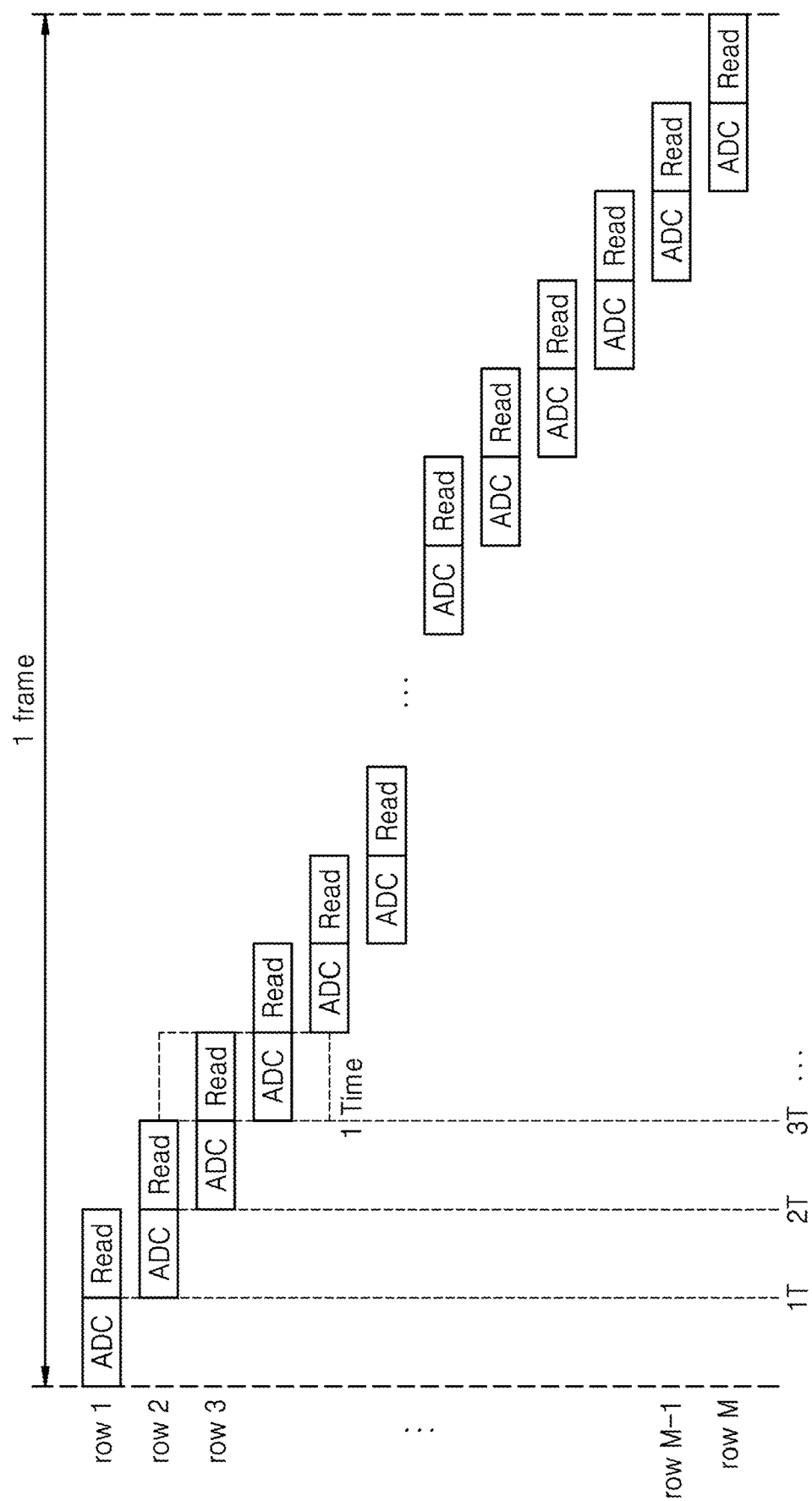
FIG. 12 illustrates a timing diagram of an operation example of a semiconductor device including an address decoder according to an example embodiment.

FIG. 12 is a timing diagram illustrating an operation example of a semiconductor device including an address decoder according to an example embodiment, and may be understood with reference to FIG. 10. A horizontal axis of FIG. 12 represents time and a vertical axis represents a location of a column.

In a first period 0 to 1T, each of the plurality of cell signals US generated in a first row row1 of the cell array 700 among the plurality of unit cells 710 is output to the column circuit 550 through the column line CL. An analog-to-digital conversion of each of the plurality of cell signals US is performed by the ADC 510, and a first digital value DV1 converted from the cell signal is stored in the memory 520.

In a second period 1T to 2T, the output buffer 540 sequentially outputs the stored first digital values DV1 in response to the column selection signals CSEL[0] to CSEL[N−1]. The output digital value may be a part of unit data UDTA.

In the same period 1T to 2T, each of the plurality of cell signals US generated in a second row row2 of the cell array 700 among the plurality of unit cells 710 is output to the column circuit 550 through the column line CL. An analog-to-digital conversion of each of the plurality of cell signals US is performed by the ADC 510, and a second digital values DV2 converted from the cell signal is stored in the memory 520.

In a third period 2T to 3T, the output buffer 540 sequentially outputs the stored second digital values DV2 in response to the column selection signals CSEL[0] to CSEL[N−1]. The output digital value may be a part of the unit data UDTA. Outputs of all columns of the unit cell may be summed to generate the unit data UDTA.

During the same period 2T to 3T, each of the plurality of cell signals US generated in a third row row3 of the cell array 700 among the plurality of unit cells 710 is output to the column circuit 550 through the column line CL. An analog-to-digital conversion of each of the plurality of cell signals US is performed by the ADC 510, and a third digital value DV3 converted from the cell signal is stored in the memory 520.

Thus, only the analog-to-digital conversion for the first column may be performed in the first period, and the analog-to-digital conversion for the second column and the reading of the digital value for the first column may be simultaneously performed from the second period.

Thus, pipe-lining may be sequentially performed for each row from a kth period, in which the analog-to-digital conversion of the kth column and reading of the digital value for the (k−1)-th column are simultaneously performed.

Figure 13A:
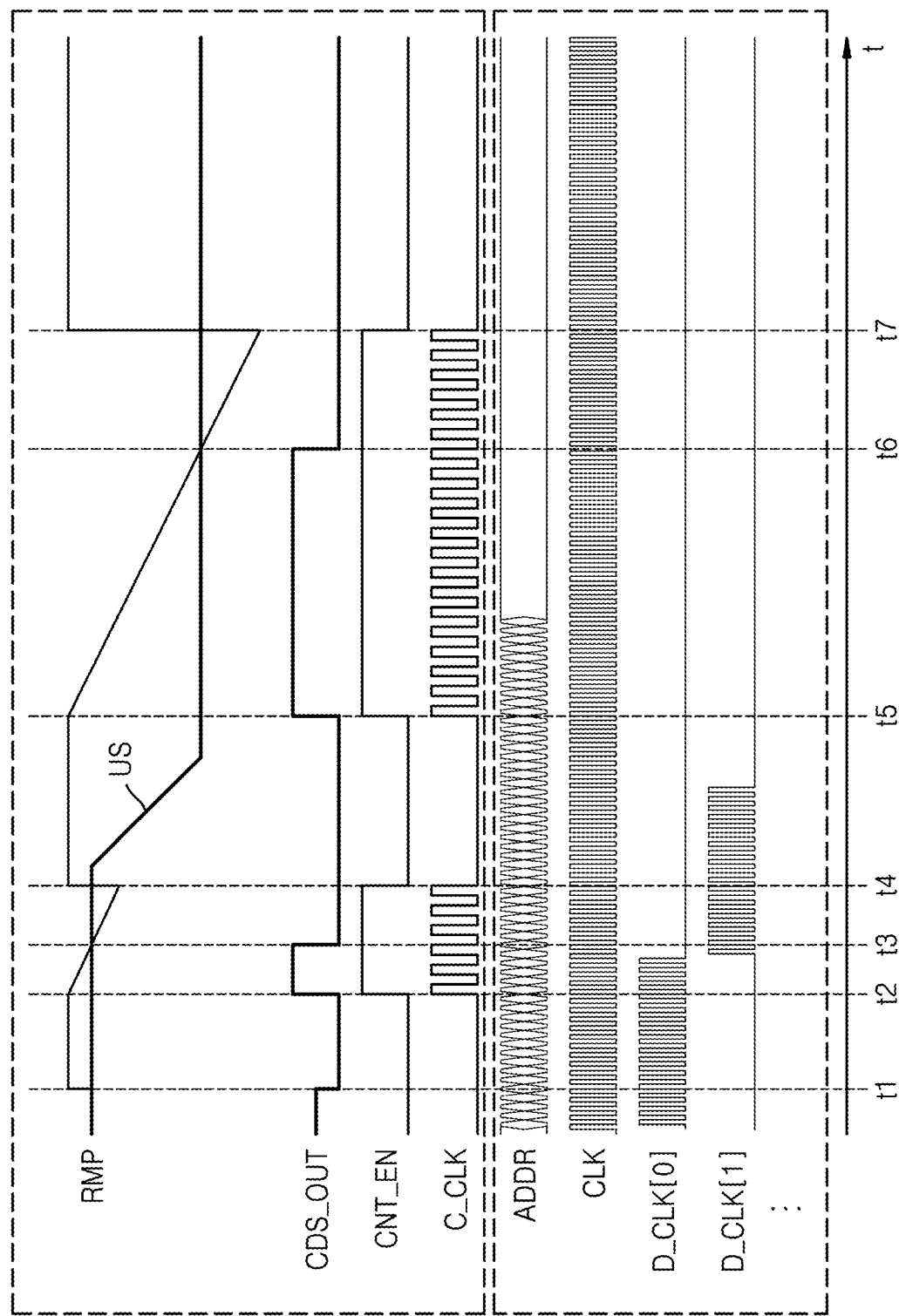
FIGS. 13A and 13B illustrate waveform diagrams of various operations of an image sensor including an address decoder according to an example embodiment.
Figure 13B:
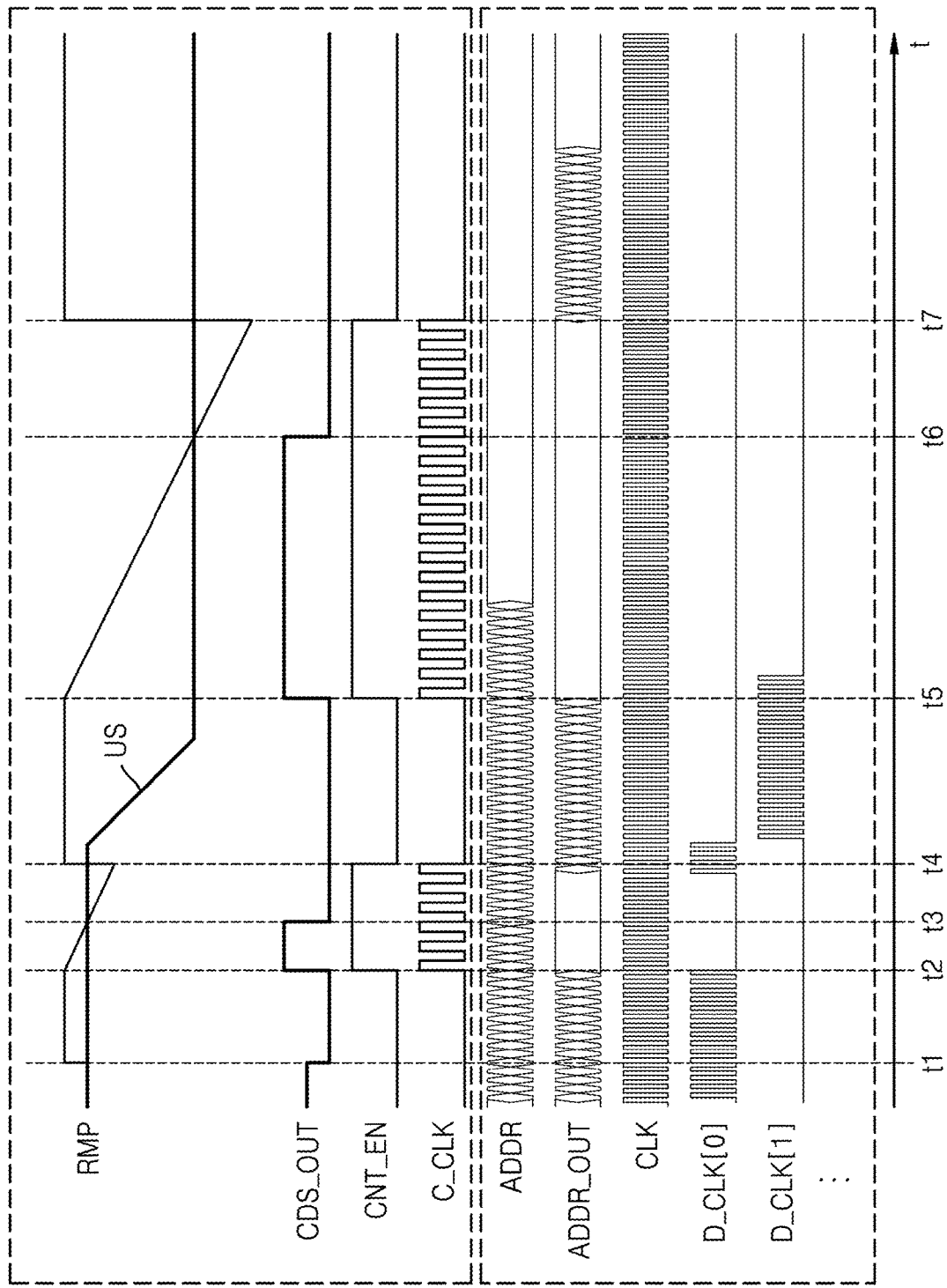

FIGS. 13A and 13B are waveform diagrams illustrating an operation example of an image sensor including the address decoder according to an example embodiment. FIGS. 13A and 13B may be understood with reference to FIGS. 2 and 10. Here, it may be understood that the unit cell 710 of FIG. 10 is the pixel 110 of FIG. 2, and the cell signal US of FIG. 10 is the pixel signal PXS of FIG. 2. In FIGS. 13A and 13B, the horizontal axes represent time and the vertical axes represent a level value of a signal. A time period from a point of time t1 to a point of time t7 of signals illustrated in FIGS. 13A and 13B may correspond to time when the analog-digital conversion operation illustrated in FIG. 12 is performed. FIG. 13A is a waveform diagram of the column driver according to an example embodiment. FIG. 13B is a waveform diagram when the address logic is included in the column driver 400 according to an example embodiment.

The address control signal ADDR_CTRL may be the same as the counter enable signal CNT_EN provided to the ADC 510 as described above with reference to FIG. 10. Thus, the address control signal ADDR_CTRL may go to a logic-high level to perform counting while the ramp signal RMP is ramped. For example, if the address control signal ADDR_CTRL goes to a logic-high level while the ramp signal RMP is ramped, the address output signals ADDR_OUT may be disabled and while the address output signals ADDR_OUT are disabled, the delay clock signals D_CLK may be disabled.

Referring to FIG. 13A, the time period from the point of time t1 to the point of time t7 may be defined as a comparison operation section in which a comparison operation (for example, correlated double sampling (CDS)) is performed. At the point of time t1, if the ramp signal RMP is enabled, the comparison signal CDS_OUT may be reset.

For a digital conversion of a reset signal, a reset conversion operation may be performed from a point of time t2 to a point of time t4. At the point of time t2, if the ramp signal RMP starts to ramp, the comparator 511 may compare the ramp signal RMP with the pixel signal PXS output from the pixel 110 and output the comparison signal CDS_OUT until a point of time t3 at which the ramp signal RMP is smaller than the pixel signal PXS. The timing generator 300 may output a counter enable signal CNT_EN, which is a signal applied to enable the counter 512 to perform counting from the point of time t2 to the point of time t4 at which the ramp signal RMP is ramped, to the counter 512 The counter 512 my compare the ramp signal RMP with the pixel signal PXS output from the pixel 110 from the point of time t2 and count the counting clock C_CLK until the point of time t3 at which the ramp signal RMP is smaller than the pixel signal PXS and thereby an output polarity of the comparator 511 changes.

If a digital conversion of the reset signal ends, a signal conversion operation for converting the pixel signal PXS into a digital signal may be performed. If the ramp signal RMP rising again at the point of time t4 starts to be ramped again at a point of time t5, the comparator 511 may compare the ramp signal RMP with the pixel signal PXS output from the pixel 110 and output the comparison signal CDS_OUT until the point of time t6 at which the ramp signal RMP is smaller than the pixel signal PXS. The timing generator 300 may output a counter enable signal CNT_EN, which is a signal applied to enable the counter 512 to perform counting from the point of time t5 to the point of time t7 at which the ramp signal RMP is ramped, to the counter 512. The counter 512 may compare the ramp signal RMP with the pixel signal PXS output from the pixel 110 From the point of time t5 and count the counting clock C_CLK until the point of time t6 at which the ramp signal RMP is smaller than the pixel signal PXS and thereby an output polarity of the comparator 511 changes.

In FIG. 13A, a pipe-lining technique may be performed in which an analog-to-digital conversion and a read operation are simultaneously performed within one period T. Thus, when an analog-to-digital conversion according to a ramping signal is performed for an N-th row rowN in the one period T, pixel data readout according to the address signal within the same period T may be sequentially performed. A sequential analog-to-digital conversion and the pixel data readout may be performed column by column. Accordingly, a pipelining technique may be applied to the analog-to-digital conversion operation and the pixel data readout.

FIG. 13B illustrates the waveform diagram when the address logic is included in the column driver 400 unlike FIG. 13A. FIG. 13B is different from FIG. 13A in that the address output signal ADDR_OUT is not output and the delay clock signals D_CLK are generated during time from the point of time t2 to the point of time t4 at which the counter enable signal CNT_EN is in a logic-high level. For example, the address logic may receive the address signal ADDR and the address control signal ADDR_CTRL to generate the address output signal ADDR_OUT for enabling or disabling the clock tree 410. The address control signal ADDR_CTRL may be the same as the counter enable signal CNT_EN as described above with reference to FIG. 10. Thus, the address output signal ADDR_OUT may not be output during an analog-digital conversion in which the counter 512 operates, and since the address output signal ADDR_OUT is not output, the delay clock signals D_CLK may not be output. Since the image sensor 10 including the address logic according to an example embodiment deactivates the clock tree 410 during the analog-to-digital conversion operation, there is an effect of preventing a power supply voltage applied to the ADC 510 from changing due to an operation of a clock tree.

Figure 14:
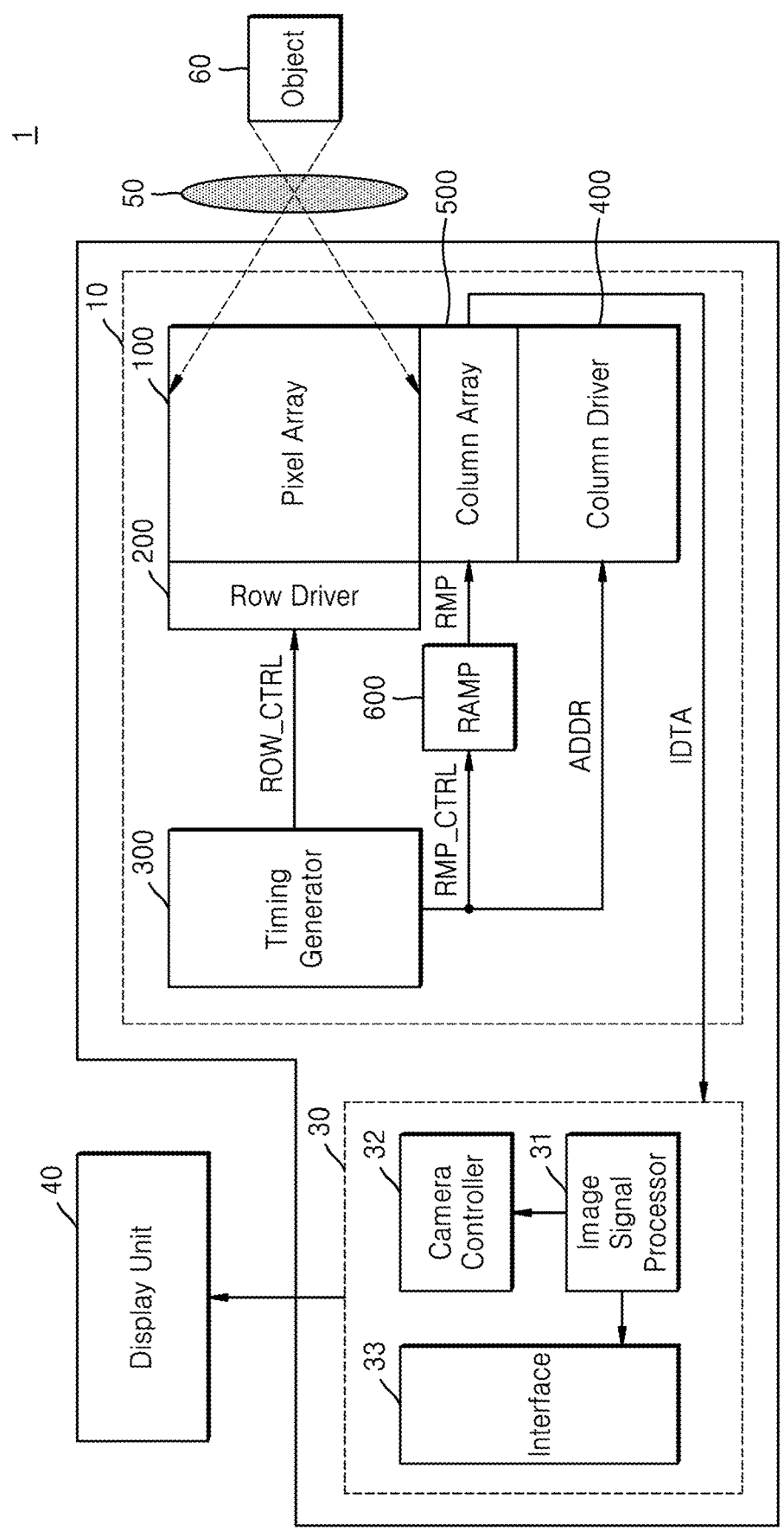
FIG. 14 illustrates a diagram of an image processing system according to an example embodiment.

FIG. 14 is a diagram illustrating an image processing system according to some embodiments. Referring to FIG. 14, an image processing system 1 according to an example embodiment may include an image sensor 10, an image processor 30, a display 40, and a lens 50.

The image sensor 10 may include a pixel array 100, a row driver 200, a timing generator 300, a column driver 400, a column array 500, and a ramp signal generator 600. The column driver 400 may include a clock tree 410 and a decoding circuit 420.

The image sensor 10 may sense an object 60 imaged through the lens 50 under a control of the image processor 30, and the image processor 30 may output an image sensed and output by the image sensor 10 to the display 40. The display 40 may include any suitable device for outputting an image. For example, the display 40 may include a computer, a mobile phone, and other image output terminals. The image processor 30 may include a camera controller 32, an image signal processor 31, and an interface 33. For example, the camera controller 32 may control the image sensor 10 by using an inter-integrated circuit (2C). In other examples, various interfaces may be applied between the camera controller 32 and the image sensor 10. The interface 33 may support one or more specified protocols that the image sensor 10 may use to connect directly or indirectly with an external electronic device (eg, the display 40). The interface 33 may interface the image data IDTA processed by the image sensor 10 to be displayed on the display 40. In an exemplary embodiment, the interface 33 may use various interfacing schemes such as high definition multimedia interface (HDMI), universal serial bus (USB) interface, SD card interface, or audio interface, IEEE 1284 parallel interface.

The image signal processor 31 may receive image data IDTA that is an output signal of an output buffer, process the image data IDTA, and output a processed image to the display 40. In another example, the image signal processor 31 may receive a control signal from an external host through the PC I/F 33, and may provide the processed image to the external host. FIG. 14 illustrates that the image signal processor 31 is located inside the image processor 30 but the image signal processor 31 may be located, for example, inside the image sensor 10.

The image sensor 10 described with reference to FIG. 2 may be applied as the image sensor 10. The image sensor 10 may output a control signal a control signal to each of the timing generator 300, the output buffer 540, and the ramp signal generator 600 to control operations thereof. The image sensor 10 may operate under a control of the camera controller 32.

The pixel array 100 may include a plurality of pixels that are arranged in a matrix and are connected to a plurality of row lines ROLs and a plurality of column lines COLs, respectively. Each of the plurality of pixels 110 may generate a pixel signal PXS.

The row driver 200 may drive the pixel array 100 row by row in response to a row control signal ROW_CTRL.

The timing generator 300 may generate the row control signal ROW_CTRL for driving the row driver 200, an address signal ADDR, a clock signal CLK, and a ramp control signal RMP_CTRL for controlling the ramp signal generator 600.

The ramp signal generator 600 may output a ramp signal RMP in response to the ramp control signal RMP_CTRL provided from the timing generator 300. The ramp signal RMP may be compared with the pixel signal PXS.

The column array 500 may convert the pixel signal PXS received through the column line COL into a pixel data value PDV in response to the ramp signal RMP provided from the ramp signal generator 600 and a column selection signal CSEL provided from the column driver 400, store the pixel data value PDV, and then output the stored pixel data value PDV. The output pixel data value PDV may be the image data IDTA.

The column driver 400 may include a clock tree 410 that includes a plurality of delay elements, for example, first and second delay elements 412 and 413. The clock tree 410 may receive the clock signal CLK and generate a plurality of delay clock signals D_CLK that are divided into at least two signals and are delayed and output. The column driver 400 may include a decoding circuit 420 that generates a plurality of column selection signals CSEL in response to the delayed clock signal and the address signal, and at least one of the plurality of delay elements may be activated in response to a clock enable signal CLK_EN generated based on the address signal ADDR.

By way of summation and review, a complementary metal-oxide semiconductor (CMOS) image sensor may operate at low power and may be used in a portable apparatus that runs on a battery.

As described above, embodiments relate to an image sensor, and more particularly, to an image sensor, an address decoder, and an image processing system that include a clock tree and a decoding circuit which are operable at low power.

Embodiments may provide an image sensor, an address decoder, and an image processing system that are operable at low power, and which may employ clock gating using a clock tree and a decoder.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An image sensor, comprising:
a pixel array including a plurality of pixels that are arranged in a matrix and respectively generate pixel signals;
a row driver configured to drive the plurality of pixels row by row;
a timing generator configured to generate a clock signal and address signals;
a column driver configured to generate a plurality of column selection signals sequentially activated in response to the clock signal and the address signals;
a column array configured to receive the pixel signals through a plurality of column lines, perform an analog-to-digital conversion on the pixel signals, and sequentially output pixel data values through an output buffer; and
a clock enable circuit, wherein:
the column driver includes:
a clock tree including a plurality of first delay elements that output first delay signals each being divided into at least two in response to the clock signal, and including a plurality of second delay elements that receive the first delay signals and output second delay signals each being divided into at least two, the clock tree being configured to generate a plurality of delay clock signals in response to the second delay signals; and
a decoding circuit configured to generate the plurality of column selection signals in response to the address signals and the plurality of delay clock signals,
at least one of the plurality of first delay elements and the plurality of second delay elements is activated in response to at least one of a plurality of clock enable signals generated based on the address signals, and
the clock enable circuit is configured to generate at least one of the plurality of clock enable signals for selecting the at least one of the plurality first delay elements and the plurality of second delay elements in response to the clock signal and the address signals.

2. The image sensor as claimed in claim 1, wherein:
the column array includes a plurality of column circuits including a plurality of comparators configured to compare each of the pixel signals with a ramp signal and output comparison signals, a plurality of counters configured to count the comparison signals and output the pixel data values, and a memory configured to store the pixel data values, and
the decoding circuit outputs a column selection signal for selecting one column circuit of the plurality of column circuits in response to the address signals and the plurality of delay clock signals.

3. The image sensor as claimed in claim 2, wherein a first clock enable signal enables a delay element selected from among the first delay elements and disables delay elements not selected from among the first delay elements.

4. The image sensor as claimed in claim 3, wherein a second clock enable signal enables a delay element selected from among the second delay elements branched from delay elements selected from among the first delay elements and disables delay elements not selected from among the second delay elements.

5. The image sensor as claimed in claim 2, wherein at least one of the plurality of second delay elements includes a logic gate.

6. The image sensor as claimed in claim 2, wherein:
at least one of the plurality of first delay elements includes a logic gate, and
at least one of the plurality of second delay elements includes an inverter.

7. The image sensor as claimed in claim 2, wherein:
the pixel array includes a plurality of pixel groups configured by an M×N matrix, where M and N are natural numbers of 2 or more,
pixel group signals generated by each of the plurality of pixel groups are output to the column array, and
the column array generates a sum data value with a higher resolution than the pixel data value by summing the pixel group signals.

8. An address decoder, comprising:
a column array including a plurality of column circuits configured to receive cell signals output from each of a plurality of unit cells arranged in a matrix through column lines, perform an analog-to-digital conversion on the cell signals, and store digital values converted from the cell signals in a memory, the column array sequentially outputting the stored digital values through an output buffer;

a column driver configured to generate column selection signals for controlling the digital values to be sequentially output; and a clock enable circuit, wherein:

the column driver includes:

a clock tree including a plurality of first delay elements that output first delay signals divided into at least two in response to a clock signal to be received, and including a plurality of second delay elements that receive the first delay signals and output second delay signals divided into at least two, the clock tree being configured to generate a plurality of delay clock signals in response to the second delay signals, and a decoding circuit configured to output the plurality of column selection signals for sequentially selecting the plurality of column circuits in response to the plurality of delay clock signals, at least one of the plurality of first delay elements and the plurality of second delay elements is sequentially activated in response to at least one of a plurality of clock enable signals generated based on address signals for selecting the plurality of column circuits, and the clock enable circuit is configured to generate at least one of the plurality of clock enable signals for selecting at least one of the plurality of first and the plurality of second delay elements in response to the address signals.

9. The address decoder as claimed in claim 8, wherein a first clock enable signal enables a delay element selected from among the first delay elements and disables delay elements not selected from among the first delay elements.

10. The address decoder as claimed in claim 8, wherein:

the column array further includes:

a plurality of comparators configured to receive the cell signals through the column lines, compare the cell signals with a ramp signal, and output comparison signals; and a plurality of counters configured to count the comparison signals and output the digital values, and the ramp signal is output from a ramp signal generator in response to a ramp control signal.

11. The address decoder as claimed in claim 8, wherein at least one of the plurality of second delay elements is configured with a logic gate.

12. An image processing system, comprising:

an image sensor configured to sense an optical signal; and an image processor configured to control the image sensor and process image data output from the image sensor, wherein:

the image sensor includes:

a pixel array including a plurality of pixels that are arranged in a matrix and generate pixel signals respectively, a column driver configured to generate a plurality of column selection signals sequentially activated in response to a clock signal and address signals, and a column array configured to receive a plurality of pixel signals from the plurality of pixels through a plurality of column lines, generate a plurality of pixel data values by performing an analog-to-digital conversion on the plurality of pixel signals, and sequentially output the plurality of pixel data values through an output buffer, and the column driver includes:

a clock tree configured to generate a plurality of delay clock signals in response to the clock signal by using a plurality of delay elements, a decoding circuit configured to generate the plurality of column selection signals in response to the address signals and the plurality of delay clock signals, and a clock enable circuit, the plurality of delay elements are sequentially activated in response to at least one of a plurality of clock enable signals generated based on the address signals, and the clock enable circuit is configured to generate the plurality of clock enable signals for selecting one of the plurality of delay elements in response to the clock signal and the address signals.

13. The image processing system as claimed in claim 12, wherein the column array further includes:

a comparator configured to receive the pixel signals through the column lines corresponding to the respective pixels, compare the pixel signals with a ramp signal, and output comparison signals to an output terminal; and a counter configured to connect to the output terminal of the comparator, count the comparison signals, and output digital values.

\* \* \* \* \*